(12) United States Patent
Cloutier et al.

(10) Patent No.: US 8,738,325 B2
(45) Date of Patent: May 27, 2014

(54) METHOD AND SYSTEM FOR ANALYZING INFORMATION TRANSFER AMONG A PLURALITY OF PARTIES

(75) Inventors: Jean-Francois Cloutier, Portland, ME (US); David G. Kamien, Livingston, NJ (US)

(73) Assignee: Mind-Alliance Systems, LLC, Roseland, NJ (US)

( * ) Notice: Subject to any disclaimer, the term of this patent is extended or adjusted under 35 U.S.C. 154(b) by 1358 days.

(21) Appl. No.: 12/373,764

(22) PCT Filed: Jul. 16, 2007

(86) PCT No.: PCT/US2007/073626
§ 371 (c)(1),
(2), (4) Date: Jan. 3, 2011

(87) PCT Pub. No.: WO2008/009026
PCT Pub. Date: Jan. 17, 2008

(65) Prior Publication Data
US 2011/0125839 A1     May 26, 2011

Related U.S. Application Data

(60) Provisional application No. 60/831,051, filed on Jul. 14, 2006.

(51) Int. Cl.
| | | |
|---|---|---|
| *G06Q 10/06* | (2012.01) | |
| *G06F 11/32* | (2006.01) | |
| *H04L 23/00* | (2006.01) | |
| *G06F 17/40* | (2006.01) | |
| *H04L 12/26* | (2006.01) | |

(52) U.S. Cl.
CPC .......... *G06Q 10/06* (2013.01); *G06F 11/32* (2013.01); *H04L 43/08* (2013.01); *H04L 23/00* (2013.01); *G06F 17/40* (2013.01)

USPC ......... 702/182; 702/187; 705/7.12; 705/7.23; 705/7.27; 705/300

(58) Field of Classification Search
CPC ......... G01D 21/00; G06F 11/00; G06F 11/32; G06F 17/00; G06F 17/40; G06F 19/00; G06Q 10/00; G06Q 10/06; G06Q 10/063; G06Q 10/0631; G06Q 10/0633; G06Q 99/00; H04L 23/00; H04L 43/00; H04L 43/08; H04L 43/0876
USPC .............. 370/229, 431, 464; 702/1, 127, 182, 702/187, 188; 705/1.1, 7.11, 7.12, 7.13, 705/7.14, 7.15, 7.23, 7.27, 300, 301, 345, 705/400; 709/223, 224, 226
IPC ........... G01D 21/00; G06F 11/00, 11/30, 11/32, G06F 17/00, 17/40, 19/00; G06Q 10/00, G06Q 10/06, 10/063, 10/0631, 10/0633, G06Q 99/00; H04L 23/00, 43/00, 43/08, H04L 43/0876
See application file for complete search history.

(56) References Cited

U.S. PATENT DOCUMENTS 5,208,765 A * 5/1993 Turnbull ........................ 702/84
5,490,097 A * 2/1996 Swenson et al. ................. 703/2
(Continued)

*Primary Examiner* — Edward Cosimano
(74) *Attorney, Agent, or Firm* — Stroock & Stroock & Lavan LLP

(57) ABSTRACT

A method and system for using a structured analytical process to model, analyze, plan and improve anticipated flows of information across agencies, department, companies etc. and across different disciplines and jurisdictions. The method includes a structured process for improving the flow of information through need-based communication planning. The method identifies the need for information, describes its availability and specifies the restrictions on its dissemination. It then uncovers information sharing opportunities, generates communication plans, discovers preventable communication breakdowns and prioritizes their remediations.

26 Claims, 59 Drawing Sheets

(56) References Cited

U.S. PATENT DOCUMENTS

| | | | |
|---|---|---|---|
| 5,848,271 A * | 12/1998 | Caruso et al. | 712/220 |
| 5,999,911 A * | 12/1999 | Berg et al. | 705/7.26 |
| 6,154,465 A | 11/2000 | Pickett | |
| 6,266,340 B1 | 7/2001 | Pickett et al. | |
| 6,289,025 B1 | 9/2001 | Pang et al. | |
| 6,633,848 B1 | 10/2003 | Johnson et al. | |
| 7,051,036 B2 * | 5/2006 | Rosnow et al. | 707/723 |
| 7,899,756 B2 * | 3/2011 | Rizzolo et al. | 705/300 |
| 8,145,671 B2 * | 3/2012 | Rizzolo et al. | 707/790 |
| 8,326,870 B2 * | 12/2012 | Rizzolo et al. | 707/781 |
| 2003/0106039 A1 * | 6/2003 | Rosnow et al. | 717/100 |
| 2006/0117012 A1 * | 6/2006 | Rizzolo et al. | 707/9 |
| 2006/0224399 A1 * | 10/2006 | Alkemper et al. | 705/1 |
| 2011/0112886 A1 * | 5/2011 | Rizzolo et al. | 705/7.28 |
| 2011/0112887 A1 * | 5/2011 | Rizzolo et al. | 705/7.28 |

* cited by examiner

| Information about "car accident" events ||||
|---|---|---|
| Topic | EOI | Value constraint |
| Vehicle (repeated) | Year | Between year 1900 and current year + 1 |
| | Make | |
| | Propulsion | Gasoline/ethanol, diesel, natural gas, electrical or hybrid |
| | Color | |
| | Damage | |
| Location | Road | |
| | Milepost | Zero or more miles |

FIG. 8

| Information about "accident" events |||  |
|---|---|---|---|
| Topic ||  EOI | Value constraint |
| (none) || Type |  |
| Victim (repeated) | Identity | Gender | Male or female |
| | | Age | Zero or more years |
| | | Name | |
| | | Passenger | Yes or no |
| | Injury | Fatal | Yes or no |
| | | Trauma | |
| Witness (repeated) | Identity | Name | |
| | | Age | Zero or more years |
| | | Legal status | |
| | Contact | Phone number | |
| | | Address | |

FIG. 9

| Activity | Description | When |
|---|---|---|
| Create project | Name and describe it. Describe and categorize its missions (possibly as UTL missions). | At any time. |
| Set project participation | Identify the organizations and roles of participants the project will admit. | After "Create project" |
| Set project scope | Specify the kinds of organizations that can be represented in the project's scenarios. | After "Create project" |
| Create a scenario | Create a scenario that will contain one or more storylines. Name, describe and categorize the scenario. Add at least one incident (an event or task with no stated cause – see Depicting activities). Identify the situations (affecting resources and policies) that apply to the scenario | After "Set project scope" |

FIG. 10A

| Activity | Description | When |
|---|---|---|
| Add a storyline | Add a new storyline to a scenario. Name, describe and categorize it. *When events and tasks are added to a scenario, they are assigned to one or more of its storylines.* | After "Create scenario" |
| Invite new participant | Invite someone who meets the participation requirements to join the project. | After "Set project participation" |

FIG. 10B

| Activity | Description | When |
|---|---|---|
| Define a category | Select the appropriate taxonomy.<br><br>Name, describe the new category.<br><br>Identify what other categories this one implies.<br><br>Identify the discipline this category belongs to.<br><br>Identify the standard, if any, this *category* belongs to. | At any time but usually ahead of profiling and modeling |

FIG. 12

| Activity | Description | When |
|---|---|---|
| Associate information template with a category | Describe elements of information, grouped in topics, that could be communicated about something belonging to a given category. | After "Define a category" |
| Define a location | Name, describe and categorize a location.<br><br>Give its coordinates and its radius, if meaningful.<br><br>Identify what other locations directly encompass it and those that border it. | At any time but usually ahead of profiling and modeling.<br><br>After "Define a category" if categorized. |

FIG. 13

| Activity | Description | When |
|---|---|---|
| Define a policy | Name, describe and categorize a policy.<br><br>Specify the kinds of tasks or sharing needs targeted by the policy.<br><br>Identify the organization that issued the policy and the organization, possibly a different one, that is responsible for enforcing it. | At any time but usually ahead of profiling and modeling.<br><br>After "Define a category" and "Profile an organization" and "Profile role" |
| Define a situation | Name and describe a situation.<br><br>Specify the kind of event that causes the situation to come into effect.<br><br>Specify the kind of event that terminates the situation.<br><br>Identify the resources that become non-operational and those that become operational.<br><br>Identify the policies that become applicable and those that become non-applicable. | Depending on what is referenced, after "Profile a resource" and "Define a policy". |

FIG. 14

| Activity | Description | When |
|---|---|---|
| Profile an organization | Name, describe and categorize an organization.<br><br>Is the organization normally operational?<br><br>Identify the parent organization.<br><br>Describe and categorize its missions.<br><br>Identify its principal location and jurisdiction. | At any time. |

FIG. 16A

| Activity | Description | When |
|---|---|---|
| Profile a role | Name, describe and categorize a role. | After "Profile an organization"; the roles add to the organization's profile. |
| | Is the role normally operational? | |
| | Specify whether the role is internal (not visible outside the organization) and whether the role is an accepted point of contact for the organization as a whole. | |
| | List the managers (as roles) for this role. | |
| | List the alternate roles to be contacted, should this one be unreachable. | |
| | Specify the accessibility of this role (what kinds of roles can contact this one?) | |
| | Specify this role's relevant expertise by describing as information templates the kind of information it could provide at any time. | |
| | List the clearances, as categories, that any person in this role is expected to have. | |

FIG. 16B

| Activity | Description | When |
|---|---|---|
| Profile a team | Name, describe and categorize a team.<br><br>Is the team normally operational?<br><br>Describe and categorize its missions.<br><br>List its members (as roles) and identify which ones are points of contact for the entire team.<br><br>Specify the team's relevant expertise (what information it can provide at any time, beyond what its individual member could on their own). | After "Profile a role"; a team groups existing roles. |

FIG 16C

| Activity | Description | When |
|---|---|---|
| Describe a channel | Name, describe and categorize a channel.<br><br>Is the channel normally operational?<br><br>Identify the other channels this one inter-operates with.<br><br>Give the levels of security and reliability afforded by this channel.<br><br>Give the worst case, average and best case transmission latency for this channel (how much time it takes to transmit some information).<br><br>Identify the information encoding formats this channel supports (voice, video, images, electronic documents etc.). | At any time. |

FIG. 17A

| Activity | Description | When |
|---|---|---|
| Profile a person | Name the person.<br><br>List the contact information, including the end point (for example, telephone number, email address etc.), the channel (for example, ATT cellular, Gmail etc.), the level of privacy (low, medium, high) and its availability (when can the person be thus contacted?)<br><br>List the clearances this person has.<br><br>List the roles this person plays in various organizations. | After "Profile a Role" and "Describe a Channel"; since both roles and channels are referenced. |

FIG. 17B

| Activity | Description | When |
|---|---|---|
| Profile a group | Name the group and identify the organization it is in.<br><br>Is the group normally operational?<br><br>Give the minimum number of persons in the group at any time.<br><br>Identify the roles played by each member of the group.<br><br>Obtain the contact information for the group. | After "Profile a role" and "Profile an organization"; a group references both. |

FIG. 17C

| Activity | Description | When |
|---|---|---|
| Describe a repository | Name, describe and categorize the repository.<br><br>Is the repository normally operational?<br><br>Identify the organization that owns the repository, as well as the organizational role of its administrator(s).<br><br>Specify the relevant information contained in the repository.<br><br>Obtain the contact information for the repository (how can it be accessed?)<br><br>Specify the organization roles who could be granted access to it. | After "Profile a role" and "Profile an organization"; a group references both. |

FIG. 18

| Activity | Description | When |
|---|---|---|
| Add an event | Name, describe and categorize the event.<br><br>Assign the event to one or more storylines in the scenario.<br><br>Give a probability that the event would occur as described.<br><br>Identify the event or task, if any, that causes this event, and indicate whether the trigger is at the start or the end of the triggering event or task.<br><br>Give the expected delay between the trigger and the beginning of the event.<br><br>Give the expected duration of the event. If none is given, the event will only end if terminated by a task.<br><br>List the tasks that, if successful, terminate this event. | After "Create a scenario" and after "Add a storyline". After "Add an event" or "Add a task", if the event is caused by an event or task. |

FIG. 20A

| Activity | Description | When |
|---|---|---|
| Add a task | Name, describe and categorize a task (for example, as Universal Task List functions).<br><br>Assign the task to one or more storylines in the scenario.<br><br>Describe and categorize the objectives of the task.<br><br>Identify the event or task, if any, that causes this task, and indicate whether the trigger is the start or end of the event or task. Also, give the expected delay between the trigger and the beginning of the task's execution.<br><br>Give the expected duration of the task. | After "Create a scenario" and after "Add a storyline". After "Add an event" or "Add a task", if the task is caused by an event or task. |

FIG. 20B

| Activity | Description | When |
|---|---|---|
| Specify agents for a task | Specify the agents executing the task.<br><br>If it is individual agents, then identify the role they share within an organization (for example, CIA analyst) or describe the role more generally (for example, any county public health officer in NJ). Also, give how many of them there would be (for example, 3 to 5).<br><br>If an agent is in fact a team, identify a predefined one (for example, the " NJ State Counter-terrorism Task Force") or describe, in terms of different roles in possibly different organizations, the team's ad hoc, task-specific composition (for example, one CIA analyst, one FBI field agent etc.).<br><br>If that is the case, then identify the elements in the scenario that influence which agents are selected.<br><br>Then identify what information about these scenario elements and about the agents are needed to make the selection (here, the floor numbers). | After "Add a task".<br><br>After "Profile a Role", "Profile a team", depending on whether the agent references a team or a role. |

FIG. 21

| Activity | Description | When |
|---|---|---|
| Add a task-produced artifact | Name, describe and categorize a physical end-product of a task. | After "Add a Task" |
| Add a task-produced knowledge | Name, describe and categorize an knowledge caused by a task.<br><br>Describe the information thus created in terms of its "elements of information" (EOI), groups of which can stated as classified and subjected to privacy constraints.<br><br>Also ascribe confidence levels in the accuracy of the information acquired from the task (for example, medium confidence in the accuracy in the EOIs about the illegal activity). | After "Add a Task" |

FIG. 22

| Activity | Description | When |
|---|---|---|
| Assert a need to know | Identify a task's agent or an organizational role who needs to know about something in a scenario, be it an event, a task, or an artifact or an knowledge produced by a task.<br><br>Identify the object of interest and specify what information about it is needed.<br><br>State how critical the information is and how urgent the need is (i.e. the time window during which the information must be received).<br><br>State how the information is to be delivered: as a notification (i.e. sent without prompting) or as a response to a request.<br><br>If the notification mode of delivery is stated, also state whether updates are wanted (notifications of changes to the information previously delivered) and whether these updates are to be delivered as soon as a change is detected or at some regular interval. | Depending on what the need to know is about and who has it, after "Specify agents of a task", or "Add an event" or "Add a task" or "Add task-produced artifact" or "Add task-produced knowledge" or "Profile role" or "Specify agents for a task". |

FIG. 23

| Activity | Description | When |
|---|---|---|
| Assert situational awareness | Identify a case of situational awareness by asserting that someone knows about an event, a task, or an artifact or knowledge produced by a task.<br><br>Identify who that someone is; it can be a task's agent or an organizational role.<br><br>Specify how much is known in terms of elements of information about the known task, event, or task-produced artifact or knowledge. | Depending on what is known and who knows it, after "Specify agents of a task", or "Add an event" or "Add a task" or "Add task-produced artifact" or "Add task-produced knowledge" or "Profile role". |
| Assert information preservation | Assert that some information produced by a task (knowledge) is preserved in a repository for later access.<br><br>Identify the repository.<br><br>Give the expected delay between information being produced and it becoming available from the repository (by default, there is no delay). | After "Add task-produced knowledge" and "Describe a repository" |

FIG. 24A

| Activity | Description | When |
|---|---|---|
| Assert mutual exclusion of events | Assert that two events caused by the same task are mutually exclusive, that if one happens the other cannot.<br><br>Identify the events in question. | After "Add event" |
| Assert exception from responsibility | Assert that a specific organization role does not execute a given task even though this is implied by the definition of one of the task's agents.<br><br>Identify the role and the task's agent that implies the role. | After "Add agent" and "Profile role" |

FIG. 24B

| Activity | Description | When |
|---|---|---|
| Find a sharing need | Select an unresolved or only partially resolved "need to know" assertion and identify a source with information to (further) satisfy it.<br><br>*The source matching the information need is either:*<br><br>• *an organizational role with the needed expertise,*<br><br>• *an agent or role with the needed (asserted) situational awareness,*<br><br>• *a repository that permanently holds needed information,*<br><br>• *a repository where needed information produced by a prior task is asserted to be preserved.* | After "Assert a need to know", and, depending on what the sharing need references, after "Assert situational awareness", "Profile a role", "Assert information preserved" |

FIG. 27A

| Activity | Description | When |
|---|---|---|
| Assert granted access | Assert that one party identified in a sharing need can directly contact the other. Identify which is which.<br><br>State whether this granted access is specific to this sharing need.<br><br>State whether this granted access is conditional to some situation being in effect, and if so identify it (for example, a county public health officer can directly contact the state governor if a quarantine is in effect). | After "Find a sharing need" |

FIG. 27B

| Activity | Description | When |
|---|---|---|
| Assert agreement to share | Assert that the organization managing or administering the source of information in a sharing need (a role or a repository) explicitly authorizes the communication of the needed information.<br><br>Identify the situation, if any, in which this agreement is restricted.<br><br>State the "terms of service" for the agreement to share, namely the available formats of information delivery, whether a confirmation of receipt is requested, and the estimated time of delivery. | After "Find a sharing need", and "Define a situation" if one is referenced |
| Check clearance and privacy restrictions | For a given sharing agreement, verify that the intended recipient has the necessary clearances, given the classification restrictions on the needed information.<br><br>Also verify that the intended recipient role(s) match(es) the privacy constraints imposed on dissemination of the information.<br><br>Identify what subset of the needed information (what elements of information) satisfy all secrecy and privacy requirements, and thus could in fact be shared to fulfill, in part or in full, the sharing need. | After "Find a sharing need" and "Profile a role" |

FIG. 28

| Activity | Description | When |
|---|---|---|
| Identify an effective situation | For a given scenario, identify a situation that comes in effect.<br><br>Establish the duration of the circumstances, if a terminating event follows the trigger event in the scenario. | After "Add an event", "Define a situation" |
| Verify that resources are operational | Verify that the resources that would be involved in a sharing need (roles, repository) or in communications (roles and channels) are operational in the effective situation. | After "Find a sharing need" and "Identify an effective situation" |
| Assert a task as regulated | Assert that a task is either forbidden or obligated by a policy, possibly because a situation is in effect while the task is to be executed.<br><br>Identify the task and the policy.<br><br>State whether the policy forbids or obligates the task.<br><br>Describe the language of the policy.<br><br>Identify the effective situation if the application of the policy is dependent on it. | After "Add a task", and after "Identify an effective situation", if one is referenced |

FIG. 29

| Activity | Description | When |
|---|---|---|
| Assert needed sharing as regulated | An organization may be either forbidden or obligated by policy to satisfy a given sharing need, possibly because some situation is in effect.<br><br>Identify the sharing need and policy.<br><br>State whether the policy forbids or obligates sharing.<br><br>Describe the language of the policy.<br><br>Identify the effective situation if the applicability of the policy is dependent on it. | After "Find a sharing need", and after "Identify an effective situation" if one is referenced. |
| Verify needed sharing as permissible | Verify that the satisfaction of an uncovered sharing need is permissible because:<br><br>• the source is operational and agrees to share<br>• no policy forbids it<br>• all secrecy or privacy constraints would be satisfied | After "Assert granted access", "Assert needed sharing as regulated", "Check clearances and privacy restrictions", "Assert agreement to share" and "Verify resources are operational" |

FIG. 30

| Activity | Description | When |
|---|---|---|
| Draw a communication pathway | Given a permitted sharing of needed information, find a sequence of communications that (partially) satisfies it.<br><br>*Sharing is permitted if no policy forbids it, and if all secrecy and privacy requirements are met by the recipient.*<br><br>*The communications that together make a communication pathway are notifications, requests or responses.*<br><br>*A sequence is assembled based on:*<br><br>• *the requirements of the "need to know",*<br>• *the contact information of the source and intended recipient of information,*<br>• *the access granted to the source or recipient,*<br>• *the resources that are then operational,*<br>• *the security and privacy of the channels used,*<br>• *the information formats supported by channels used.*<br><br>*The sequence may include intermediates that overcome direct access restrictions and forward a notification, a request or a response.* | After "Verify needed sharing is permissible", "Verify resources are operational" |

FIG. 31

| Activity | Description | When |
|---|---|---|
| Find an unsatisfiable "need to know" | Identify an asserted "need to know" that can not be satisfied based on the currently profiled resources and other assertions in the scenario.<br><br>Or identify a "need to know" leading to a non-permissible sharing need. | After "Assert a need to know" or "Verify sharing need permissible" (failed) |
| Find an unsatisfiable sharing need | Identify a sharing need for which no communication pathway can be drawn.<br><br>*A resource involved (channel, organization, role) is not operational in the effective situation*<br><br>*The source with the needed information is not permitted to share it with the role who needs it.*<br><br>*Or no authorized sequence of communications, even involving intermediaries, can be found that connects the source and the intended recipients*<br><br>Identify the cause(s) among the following: secrecy, privacy, policy constraint, absence of a sharing agreement, excessive communication delays, and insufficient access rights. | After "Draw communication pathway" (failed) |

FIG. 32

| Activity | Description | When |
|---|---|---|
| Uncover an issue in a communication pathway | Look for weak links in a communication pathway.<br><br>*A weak link is a communication act that is jeopardized by one or more of the following:*<br><br>• *inadequate channel for reasons of security, privacy, reliability or latency;*<br><br>• *communication delays overrun the time window of the "need to know";*<br><br>• *no known person or group in a sender or receiver role,*<br><br>• *time slots where there is no available person or group in a sender or receiver role.*<br><br>Identify the nature of the weak link. | After "Draw a communication pathway" (succeeded) |

FIG. 33

| Activity | Description | When |
|---|---|---|
| Assess the impacts of an issue | Select an issue and determine what task, if any, could fail as a direct consequence of the failure to share or failure to know represented by the issue.<br><br>Estimate the probablity of the task failing because of the failure to share. Also estimate the severity of such of failure.<br><br>Propagate the impacts of a task failure on other tasks and list the indirect impacts of an issue.<br><br>If a jeopardized task or frustrated sharing need is regulated (it is required by law, for example), then the issue may introduce legal or regulatory liabilities.<br><br>From this analysis, assign a severity level to the issue. | After "Find an unsatisfiable need to know" or "Find an unsatisfiable sharing need" or "Uncover an issue in a communicati on pathway" or "Add a task" or "Assert a task as regulated" or "Assert needed sharing as regulated" |

FIG. 37A

| Activity | Description | When |
|---|---|---|
| Estimate the costs of an issue and of its remediation | Estimate the economic costs of the damages caused by the impacts of an information sharing issue.<br><br>Estimate the costs of remediation for the issue. | After "Assess the impacts of an issue" |
| Identify a bottleneck risk | Select a scenario and examine all the communication pathways.<br><br>Identify a role that often acts as a source or recipient or intermediary.<br><br>Assess whether this role represents a potential bottleneck. | After "Draw a communication pathway" |

FIG. 37B

| Activity | Description | When |
|---|---|---|
| Identify a single point of failure risk | Select a scenario and examine all the communication pathways.<br><br>Identify a role that plays an essential role in numerous communication pathways for which there are no alternative.<br><br>Assess whether this role represents a single point of failure. | After "Draw a communication pathway" |
| Evaluate information sharing capability | Regularly compute information sharing capability metrics per scenario and detect trends in their value for the duration of the project.<br><br>Useful metrics are:<br><br>• Count of roles, tasks, events<br>• Count of need to know assertions, sharing needs and issues<br>• Ratio of unsatisfiable need to know and sharing needs<br>• Average severity of issues<br>• Ratio of communications that are inter-organization and inter-discipline<br>• Average cost of issue remediation | After "Create a scenario" |

FIG. 38

| Activity | Description | When |
|---|---|---|
| Assemble a communication plan | Select a scenario and an organizational role.<br><br>Assemble the communication acts (notifications, requests and responses) that involve the chosen role in all communication pathways in this scenario.<br><br>For each communication act:<br><br>• Identify the events or tasks that most directly motivate each communication act.<br><br>• Collect the constraints on the communication act (urgency, security, privacy, format etc.)<br><br>• Identify the person that would be contacting the role, or the person that the role would be contacting.<br><br>• Identify the contact information.<br><br>• Summarize the nature and purpose of the communication.<br><br>• Identify other persons to contact should the communication fail (alternates and escalation). | After "Draw a communication pathway" |

FIG. 40

| Activity | Description | When |
|---|---|---|
| Validate a communication plan | Verify that a communication plan is aligned with experience and expectations.<br><br>Identify missing communications and correct omissions by:<br><br>• Adding a missing "need to know" assertion that would motivate the missing communication.<br><br>• Adding a "situational awareness" assertion or expanding the scope of expertise of a role to match a "need to know" and motivate communication.<br><br>• Profiling a missing person or role | After "Assemble a communication plan" |

FIG. 41A

| Activity | Description | When |
|---|---|---|
| Assemble a sharing MOU | Select two organizations.<br><br>Collect all "agreement to share" assertions where one organization agrees to share and the other is the beneficiary.<br><br>For each agreement to share, and given the sharing need it is attached to:<br><br>• Identify who is sharing and who is benefiting<br><br>• Identify the information to be shared<br><br>• Identify the context (a task or a role's standing need)<br><br>• Identify the policies (possibly situation-dependent) that obligate the sharing | After "Assert agreement to share" |

FIG. 41B

| Activity | Description | When |
|---|---|---|
| Validate a sharing MOU | Verify that the sharing MOUs represent the intents of the organizations.<br><br>Evaluate the degree of sharing reciprocity.<br><br>Add or remove "agreement to share" assertions so as to reflect pre-existing sharing protocols, align the MOU with the organization's sharing policy, or to "recalibrate" reciprocity.<br><br>*Agreements that are obligated by policies can not be removed.* | After "Assemble a sharing MOU" |
| Prioritize issue remediation | Select a scenario and an organization.<br><br>Assemble all issues that involve a role in this organization.<br><br>Assign a priority to the resolution of each issue taking into account its estimated cost and the estimated cost of remediation. | After "Estimate costs of an issue and of its remediation" |

FIG. 42

METHOD AND SYSTEM FOR ANALYZING INFORMATION TRANSFER AMONG A PLURALITY OF PARTIES

CROSS-REFERENCE TO PRIOR APPLICATIONS

This is a U.S. National Phase application under 35. U.S.C §371 of International Application No. PCT/US07/73626, filed Jul. 16, 2007 and claims the benefit of expired U.S. Provisional Application No. 60/831,051, filed Jul. 14, 2006, both of which are incorporated by reference herein. The International Application was published in English on Jan. 17, 2008 as WO 2008/009026 A2 under PCT Article 21(2).

FIELD OF THE INVENTION

The present invention relates to a method and system for planning communications amongst multiple parties from the analysis of information sharing needs and failures in anticipated circumstances.

BACKGROUND OF THE INVENTION

The ability to manage information sharing as a process and to systematically improve upon it is a core competency of large corporations, partnerships and communities of agencies. Yet, there is no common approach to and shared framework for methodically analyzing and improving the capability of communities of agencies etc. to effectively share information, particularly across different disciplines including manufacturing, law enforcement, public health and transportation.

Without a method and system for anticipating and planning the flow of information based on circumstances and information needs, the lack of a shared "concept of operations" for information sharing, and the presence of communication gaps and bottlenecks are likely to reduce effective collaboration.

Communication planning based on anticipating information sharing needs should be distinguished from information requirements analysis, business process modeling, workflow analysis and notification management.

Information requirements analysis is more tactical; a finite phase in systems integration projects, it is usually conducted by engineers who: (a) examine the business processes that drive information exchanges; (b) are typically eager to "freeze" and get sign-off on a "requirements document," and (c) start building the technical means to move discrete types of data (e.g. police records, death notices, and drivers license photos) from system to system. Engineers have little incentive to detect or deal with information sharing issues, political and otherwise, that cannot be addressed by their technology or project, especially within a set timetable or budget.

With needs-based communications planning, on the other hand, the focus is on the circumstances, requirements, parties, contents, means, agreements and policies specifying information sharing. A communications planner is typically a senior official who needs to evaluate how capable a state or region would be at sharing information across agencies and disciplines if a scenario were to occur, how an organization's current information sharing capability compares to where it was six months ago, what the most critical sharing gaps are for a given scenario and what is being done to fix them.

Needs-based communications planning is thus more strategic than information requirements analysis because it enables communities of agencies etc. to collaboratively risk-manage the most critical information sharing gaps involving any number of communication technologies and focus limited time and money on the most critical gaps.

Business process modeling differs from needs-based communications planning in that it models the processes of an enterprise or set of enterprises in order to describe these processes or prescribe changes to them. Similarly, workflow analysis aims at modeling, scheduling, improving and automating the flow of work within an enterprise or across enterprises. The methods defined and used in business process modeling and workflow analysis all emphasize business functions and work processes. They do not define a systematic process for analyzing information sharing needs from which to derive communication plans, detect potential failures and assess their systemic impacts.

The Notification management solutions typically consist of methods and systems for the encoding and automating communication plans. Notification management methods and systems do not address the problem of generating communication plans they automate from an analysis of information needs and availability.

SUMMARY OF THE INVENTION

The invention provides a method and system for using a structured analytical process to model, analyze, plan and improve anticipated flows of information across agencies, department, companies etc. and across different disciplines and jurisdictions.

The method includes a structured process for improving the flow of information through need-based communication planning.

The method identifies the need for information, describes its availability and specifies the restrictions on its dissemination. It then uncovers information sharing opportunities, generates communication plans, discovers preventable communication breakdowns and prioritizes their remediations.

The method helps in identifying how information should flow within and across sectors, disciplines, agencies and jurisdictions, and helps ensure that gaps and bottlenecks do not prevent the right information from getting to the right people at the right time.

One embodiment of the invention is a system that enables multiple individuals to collaboratively apply the method via networked computers connected to a server that enables on-line collaboration and automates certain aspects of the method. The individuals participate in communication planning projects.

The term "communications planning" used to describe the invention must not be confused with its use in the field of public relations. In the field of public relations, the term "communications planning" often means a set of general guidelines for managing an orderly dissemination of information to produce a favorable outcome for an enterprise or an agency.

In the preferred embodiment, users of the system engaged in a joint communications planning project (participants) ideally are the stakeholders who depend on effective information sharing to accomplish their respective missions.

Participants jointly describe scenarios by, among other things, telling what happens, who does what, when and why, profiling the people, systems and other resources involved, asserting "know" and "need to know", identifying sharing needs and placing restrictions on them, planning communications that are required and possible, finding and estimating the impacts and costs of information sharing failures, and prioritizing their remediations. Participants apply the method to systematically capture and analyze how people in organizational roles need to communicate within hypothetical scenarios. From this analysis, participants uncover information sharing issues and produce communication plans.

The method includes a systematic process for doing needs-based communication planning. It includes individual activities carried out by the participants of a communications planning project. The activities can be grouped thematically. While the grouping suggests an overall, logical progression, the process is a flexible and iterative one. No fixed sequencing of activities is imposed beyond the fact that most build on the output of prior activities. Many activities can be pursed on an opportunistic basis, constrained only by end-products of prior activities and guided by the participants' collective intent.

Groups of activities identified in the preferred embodiment of the invention are Framing, Profiling, Modeling, Defining, Discovering, Assessing and Planning.

"Framing" activities are directed at setting the scope, missions, participation and structure of needs-based communication planning projects.

"Defining" activities are directed at growing a shared vocabulary for categorizing resources and scenario elements, and for describing what can be known about them. They are also directed at identifying and describing common situations and policies.

"Profiling" activities are directed at describing the actors and sources of information (resources) that can be involved in scenarios.

"Modeling" activities are directed at building scenarios from initial incidents and making assertions about what information is needed and produced as a consequence.

"Discovering" activities are directed at examining scenarios and the resources involved in order to uncover and qualify sharing needs, the communication plans that satisfy them and the issues that frustrate them.

"Assessing" activities are directed at analyzing the impacts of information sharing issues, detecting risks of communication bottlenecks and points of failure, and evaluating information sharing capability.

"Planning" activities are directed at producing and validating communication plans for each scenario and organizational role. They are also directed at assembling sharing agreements and prioritizing issue resolutions.

It is important to note that most activities will be repeated and revisited many times in the course of a project. An activity, such as profiling a given organizational role, could be minimally carried out at first and then completed over time, as needed.

The return on investment from communications planning projects is realized in different ways. First and foremost, participants learn about other organizations, their missions and their role-based responsibilities. They also learn about other organizations' information needs and capabilities, and how to communicate with them. This knowledge can be very valuable during a crisis even if the actual events do not match those prepared for by building scenarios.

Participating in a project also brings tangible deliverables, tools that can be used in the field or in command and control positions. They include, but are not limited to, resources directories, information flows, communication plans, communication playbooks, notification scripts, issue impacts analysis, issues remediation plans, information sharing MOUs, and information sharing capability assessments These could be produced manually from the analysis of profiles and scenarios but, in the preferred embodiment, they are best generated by a system designed to support the method.

The resources directory is a combination of "White Pages" and "Yellow Pages". It aggregates profiled information resources, namely persons in organizational roles, teams and repositories, according to the information they can provide.

An information flow map provides the information sharing "big picture" for a single storyline in one scenario or for all storylines in a scenario.

An information sharing need is fulfilled by the direct or indirect transmission of needed information from source to recipient. A communication plan shows the many ways an information sharing need can be satisfied.

A communication playbook tells a person occupying one or more organizational roles what incoming and outgoing communications to expect in a scenario. In the preferred embodiment of the invention, it can be printed out or accessed on mobile devices and used in the field.

A role's communication responsibilities may entail the repetitive notification of a large number of individuals. The relevant parts of an organizational role's communication plans can be exported as notification scripts (usually XML files) for use by notification management systems.

One benefit of participating in a needs-based communication planning project is a deeper understanding of one's importance or significance in the overall flow of information. A failure to communicate may have local, regional or even global consequences that may cross many discipline and jurisdiction boundaries. Understanding how the impacts of a failure to share can propagate helps bring a much needed perspective.

The issue impacts analysis shows how an unremediated information sharing issue can directly impact response tasks as well as impede "downstream" tasks through the propagation of failures in the required information flow.

An issues remediation plan collects all information issues in which an organization is either as a cause or is impacted. The issues can be organized by type, likelihood, severity and costs of impacts, other organizations implicated, and costs of remediations.

An organization may have multiple information sharing MOUs, each with a different organization. An MOU lists all uncovered sharing needs within a project that involve a given pair of organizations, with either one acting as the source and the other as recipient.

Information sharing capability is a collection of measurements based on profiles and scenarios, that together paint a picture of an organization's ability to satisfy its own information needs and those of other organizations.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 8 is a table describing an example of elements of information associated with a category;

FIG. 9 is a table describing an example of elements of information associated with an implied category;

FIGS. 10A, 10B are tables that describe activities of the method grouped under Framing;

FIG. 12 is a table that describes activities of the method grouped under Defining;

FIG. 13 is a table that describes additional activities of the method grouped under Defining;

FIG. 14 is a table that describes additional activities of the method grouped under Defining;

FIGS. 16A, 16B and 16C are tables that describe activities of the method grouped under Profiling;

FIGS. 17A, 17B and 17C are tables that describe additional activities of the method grouped under Profiling;

FIG. 18 is a table that describes additional activities of the method grouped under Profiling;

FIGS. 20A and 20B are tables that describe activities of the method grouped under Modeling;

FIG. 21 is a table that describes additional activities of the method grouped under Modeling;

FIG. 22 is a table that describes additional activities of the method grouped under Modeling;

FIG. 23 is a table that describes additional activities of the method grouped under Modeling;

FIGS. 24A and 24B are tables that describe additional activities of the method grouped under Modeling;

FIGS. 27A and 27B are tables that describe activities of the method grouped under Discovering;

FIG. 28 is a table that describes additional activities of the method grouped under Discovering;

FIG. 29 is a table that describes additional activities of the method grouped under Discovering;

FIG. 30 is a table that describes additional activities of the method grouped under Discovering;

FIG. 31 is a table that describes additional activities of the method grouped under Discovering;

FIG. 32 is a table that describes additional activities of the method grouped under Discovering;

FIG. 33 is a table that describes additional activities of the method grouped under Discovering;

FIGS. 37A and 37B are tables that describe activities of the method grouped under Assessing;

FIG. 38 is a table that describes additional activities of the method grouped under Assessing;

FIG. 40 is a table that describes activities of the method grouped under Planning;

FIGS. 41A and 41B are tables that describe additional activities of the method grouped under Planning;

FIG. 42 is a table that describes additional activities of the method grouped under Planning;

DETAILED DESCRIPTION OF THE PREFERRED EMBODIMENTS

Participants in communications planning projects apply the method and use the system to systematically capture and analyze how people in organizational roles need to communicate within hypothetical scenarios. From this analysis, participants uncover information sharing issues and produce communication plans. A project is composed of scenarios.

Figure 1:
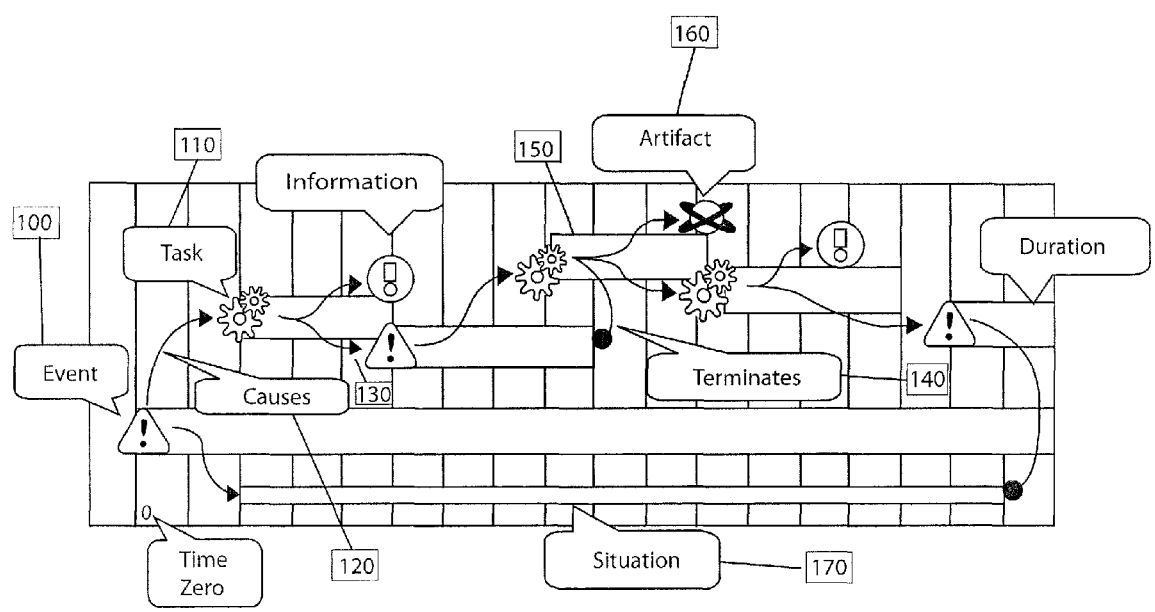
FIG. 1 is an illustration of elements of a scenario.

A scenario, as shown in FIG. 1, begins with one or more initiating events 100 or task 110, also called incidents (because they are not caused by other events or tasks within the scenario).

A scenario can be divided into storylines. Each storyline describes a different sequence of events, tasks and their end-products flowing from the scenario's incidents. For example, in a "hurricane response" scenario, one storyline might concentrate on the rescue effort, another on business continuity for an enterprise, and yet another on the logistics of mass evacuation. The storylines within a scenario can share common tasks and events. Storylines allow otherwise overly complex scenarios to be partitioned into more manageable and largely independent threads.

An event is something of significance that becomes true in the world, possibly only for a limited time, such as "the inventory of antibiotics is low" or "a train is derailed". A task, such as "distribute antibiotics" or "assess casualties," is what individuals or teams do to bring about desirable changes in the world.

Tasks and events are connected. Events can cause 120 tasks to start or stop. Tasks can cause 130 or terminate 140 events. Events can directly cause events (for example, an explosion can cause a fire) and tasks can directly cause 150 other tasks (for example, "order antibiotics" directly triggers "distribute antibiotics").

Participants build a scenario and its storylines by describing the tasks executed by organizational roles in response to events. In the description of the tasks, the emphasis is put on the nature of the information needed and produced. Tasks can represent physical interventions, such as putting out a fire, or represent decision making tasks, such as deciding whether to declare a quarantine. Tasks may produce artifacts 160 (for example, an autopsy produces tissue samples) as well as cause further events that then trigger other tasks in response, and so on, driving the exercise forward.

Scenarios involve resources of various kinds: organizations are managed groups of persons working together to achieve some defined missions, organizational roles that represent responsibilities assigned by organizations to their members, repositories administered by organizations to store information for later retrieval, and communication channels over which information is transmitted.

Other kinds of resources include: teams that coordinate the actions of roles from different organizations to act as one; persons who may play different roles in different organizations; and groups in organizations that consist of interchangeable persons, each playing the same role (the operators in a call center, for example).

Participants in the process and users of a system implementing the method profile roles and repositories in terms of the information these can provide, who manages them, how and when they can be contacted and by whom. Communication channels are profiled in terms of their interoperability, security, reliability and latency, and the kind of information they can transmit.

Participants build scenarios, broken into possibly crisscrossing storylines, in order to plan communications for an array of contingencies. Scenarios as a whole are analyzed for possible communication bottlenecks and single points of communication failure.

As illustrated in FIG. 1, scenarios can occur in the context of situations. A situation 170 represents a set of circumstances that modify, for its duration and within its scope and duration, the operational status of resources such as communication channels, or change the applicability of policies that restrict or mandate information sharing. Situations can be triggered and terminated by events within the scenario.

For example, a hurricane landfall event may render all land line communication channels non-operational for a week over an entire county, or a tenor alert red event may remove, nation-wide and for its duration, a number of legal restrictions on information sharing.

It is possible for multiple situations to be concurrently in effect during a scenario. They combine effects to determine the overall, composite situation under which tasks are executed and that may temporarily limit or expand information sharing capabilities.

Situations play an important role in communications planning because they often represent unusual and demanding communication environments that must be prepared for. Scenarios can be analyzed for information sharing failures under various, alternate situations. For example, a hurricane response scenario could be analyzed under a situation where all landline communications are disrupted as opposed to a situation where all wireless communications are also nonoperational.

Building and analyzing scenarios is a collaborative effort. All scenario elements within a single project are visible to its participants. They can see what any given role would do, cause and learn. Any participant can then add a task in response to an event, indicate a "need to know", or assert the possession of needed information.

Figure 2:
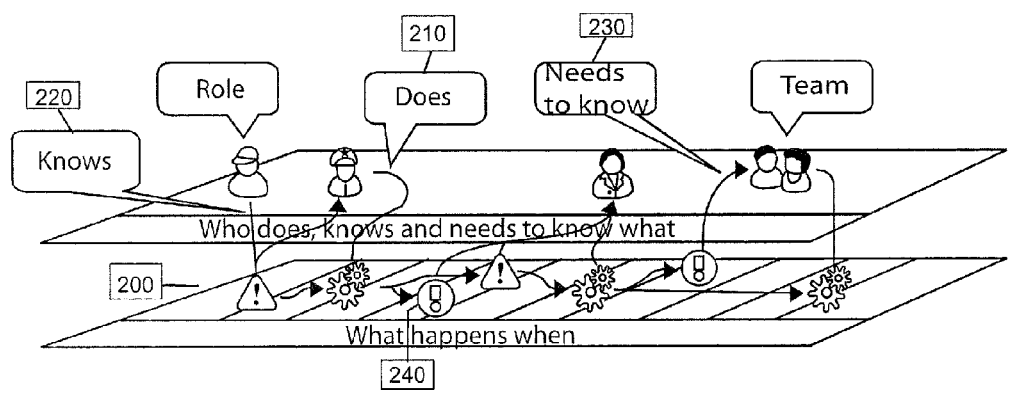
FIG. 2 is an illustration of relationships scenario elements and roles and teams.

A scenario grows as more tasks and events are added to its storylines, starting with the initiating events or tasks, or incidents. As illustrated in FIG. 2, the scenario's expanding timeline 200 provides a canvas where participants make assertions about who does 210 what task, would know 220 or would need to know 230 what about an event, a task or the information 240 created by a task. Participants also make assertions about who can access whom and where knowledge created by a task would be stored for later access.

Figure 3:
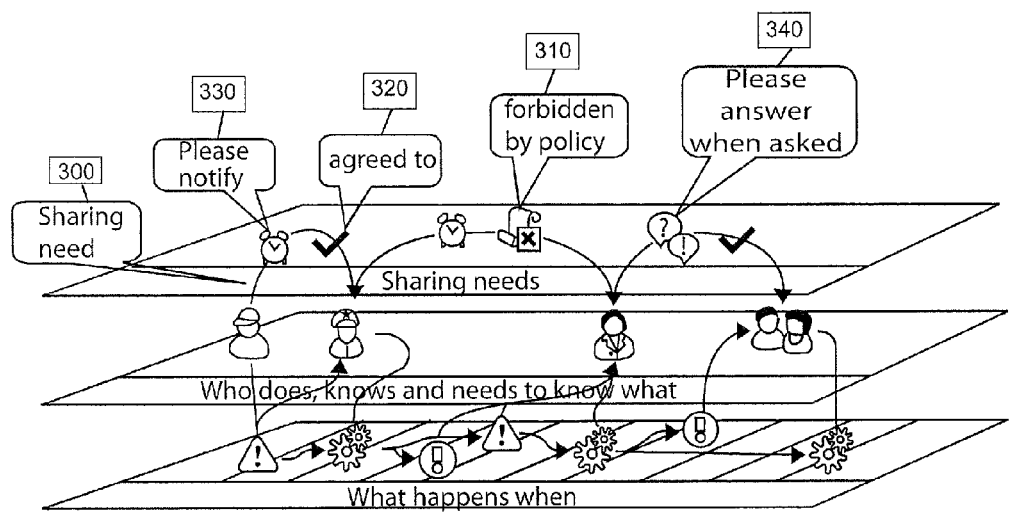
FIG. 3 is an illustration of information sharing needs as they relate to roles and teams.

A scenario and the information resources it involves, namely organizational roles and repositories, are constantly examined to find anticipated sharing needs. As illustrated in FIG. 3, a sharing need 300 is uncovered by matching "know" with "need to know." A "need to know" can be qualified as a desire to be notified 330 or to receive an answer when asked 340 about the needed information.

When a sharing need is identified, its permissibility is first ascertained by determining among other things whether the intended recipient has the necessary clearances, whether privacy constraints are broken, whether policies forbid 310 this particular sharing of information, whether the source of the needed information agrees to share, and if the source agrees to share 320, what the timeframes for the delivery of information are and whether receipt confirmation is requested.

If sharing is permitted and agreed to, then one or more alternate communication plans 400 are constructed to move the information from where it is to where it is needed. Communication plans are sequences of notifications 410, requests 420 and consequent responses 430.

Figure 4:
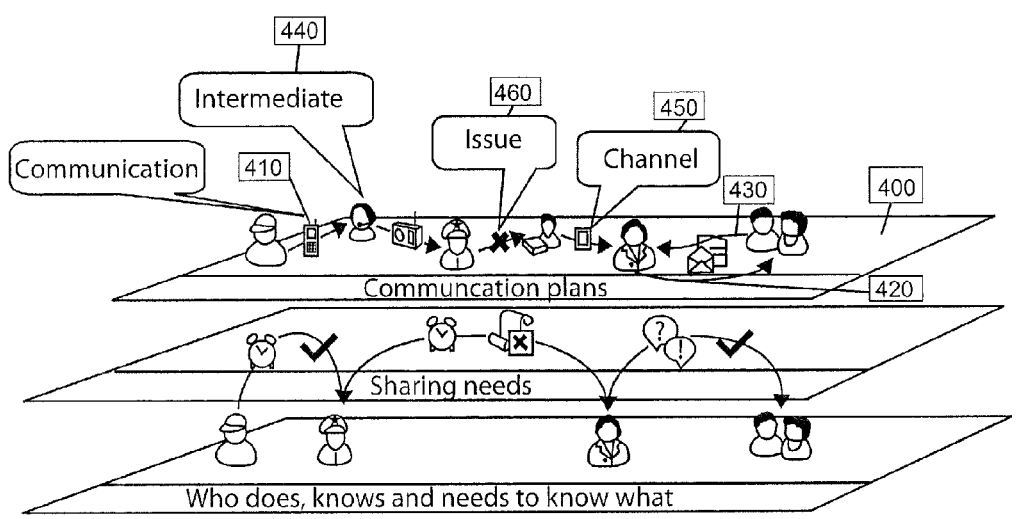
FIG. 4 is an illustration of communication plans that can satisfy information sharing needs and issues that can frustrate them.

As illustrated in FIG. 4, a communication plan may involve intermediates 440 because one may not be granted direct access to someone else. For example, information may go through an executive assistant before, perhaps, reaching a decision maker, or it may go through a "fusion center" to be vetted before being made more widely available. The information may also travel over more than one communication channel 450 until it reaches its destination. All channels are not equally secure, private, reliable or speedy. An issue 460 may be identified in one or more segments of a communication plan. Some causes of issues are an unreliable communication channel, a possibly unavailable respondent, the use of a non-private communication channel to transmit private information and excessive transmission latencies.

Figure 5:
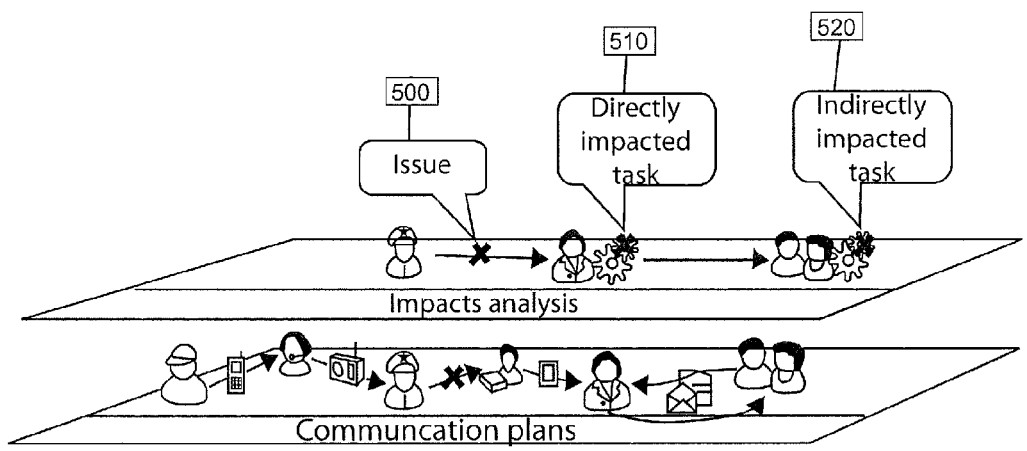
FIG. 5 is an illustration of the analysis of the impacts on tasks of a failure to satisfy an information sharing need.

As illustrated in FIG. 5, issues 500, ranging from unsatisfiable information needs, to problematic communication plans and inadequate availability of required resources, are identified and examined to determine their impacts. Impact analysis determines what response tasks could be compromised, directly 510 or indirectly 520, because of an unsatisfiable yet critical information need. From this analysis, participants assess the risks and consequences of response failures caused by information sharing "gaps."

Information sharing issues have economic costs but so do their remediations. Remediations are prioritized by a cost-benefit assessment informed by impact analysis.

Figure 6:
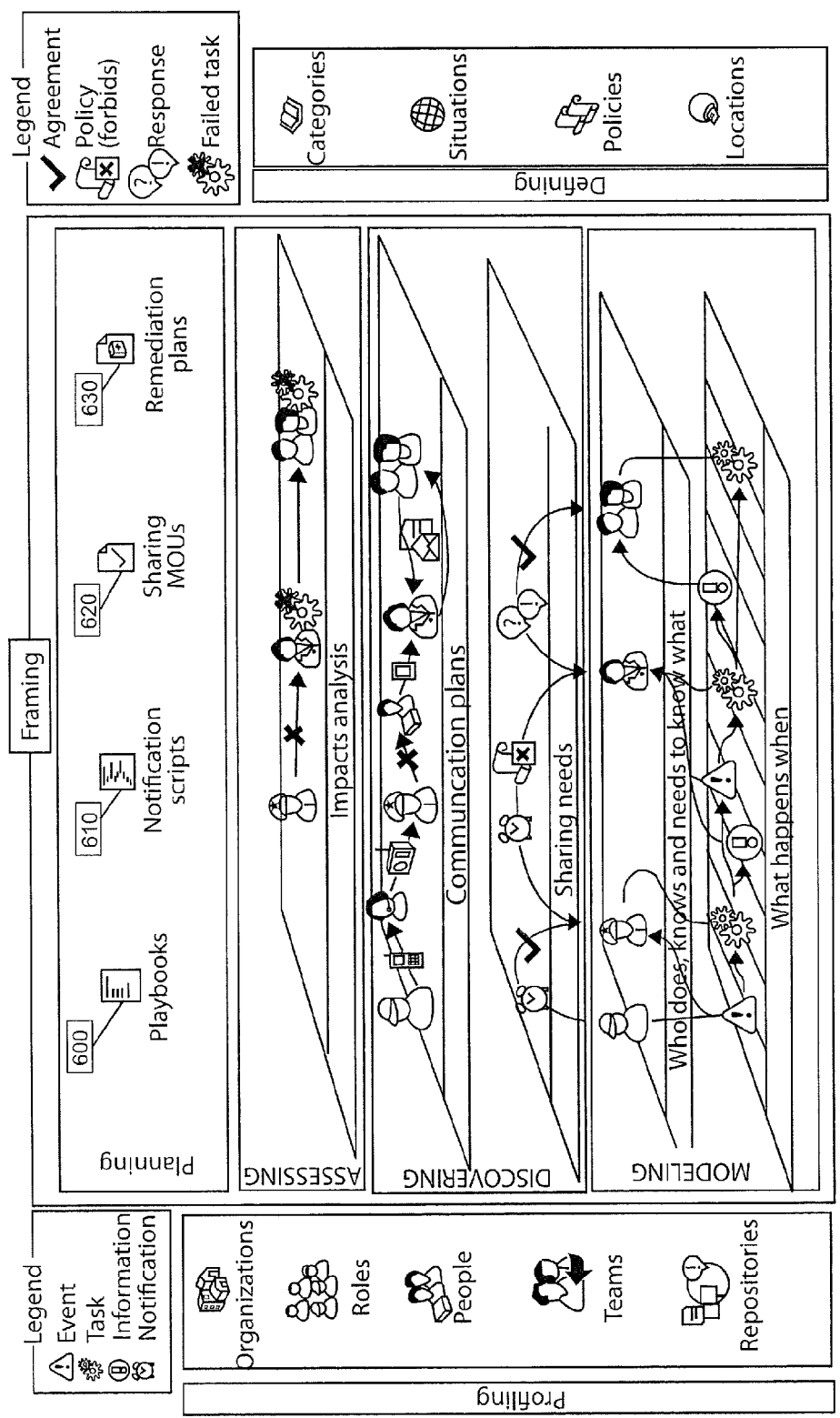
FIG. 6 is an illustration of elements of the method, how they inter-relate and how they can lead to the production of communication planning documents and reports.

As illustrated in FIG. 6, the method describes how to collect and analyze data related to information sharing from which a number of deliverables such as reports and documents can be produced by aggregating and organizing the collected and analyzed data. Communication playbooks 600 (or playbooks) are derived or constructed from the communication plans in a scenario. A playbook describes the information each organizational role would receive and transmit at various points during a scenario. A playbook relates roles and associates information sharing activities to actual persons, when they are known. It also provides contact information, timing parameters and instructions, such as escalation procedures, for bypassing communication blockages or failures. Playbooks can serve as the basis for preparedness testing and exercises. Portions of playbooks can be automated as notification scripts 610 and executed by notification systems.

An organization collects agreements to share information into information sharing MOUs 620 (memorandum of understanding). Each sharing MOU formalizes what information organizations mutually agree to share with each other. Information sharing MOUs can be evaluated for their degree of reciprocity. An organization also collects the information sharing issues they cause or that impact them, prioritize them and formulate remediation plans 630 together with the organizations involved.

As participants profile resources and model information sharing, they produce data that enables organizations to assess information sharing capability. Various metrics of information sharing capability, such as the anticipated speed of information flow or ratio of unsatisfiable to satisfiable sharing needs, can be computed, displayed and monitored over time to reveal trends.

It is very unlikely that one individual, team or even organization will know enough or have the authority to plan all communications in complex, multi-agency and multi-discipline environments. The method is by necessity an "edge-empowering", collaborative process that involves as many stakeholders as possible.

The method provides a process for structuring the information that a diverse group of organizations need in order to improve the flow of communications and information so the parties can accomplish their respective and joint missions.

Participants in a communication planning project understand one another because they speak a common language. They use a limited number of predefined concepts, such as events, tasks, situations, roles, information and channels, and because they share a vocabulary of categories, situations, policies and locations, pre-defined by domain experts but extensible, to describe instances of these concepts.

Categories in the present method enable efficient classification, grouping and interlinking descriptions of roles, events, tasks, communication channels or just about everything else that is profiled, modeled or analyzed.

More than one category can be applied at a time. For example, an event representing the derailment of a train carrying toxic substances could be categorized as a "derailment" as well as a "toxic spill" event. If the derailment was an act of sabotage, then the "terrorism" event category would apply as well. Together, these categories classify the event using concepts that are understood and agreed to by all participants.

Participants define events, and other model elements, by naming them, briefly describing them in free-form text and, more importantly, by classifying them using widely accepted categories. Participants usually choose categories from a pre-defined taxonomy. They may however add to this taxonomy when they do not find a category they need.

Figure 7:
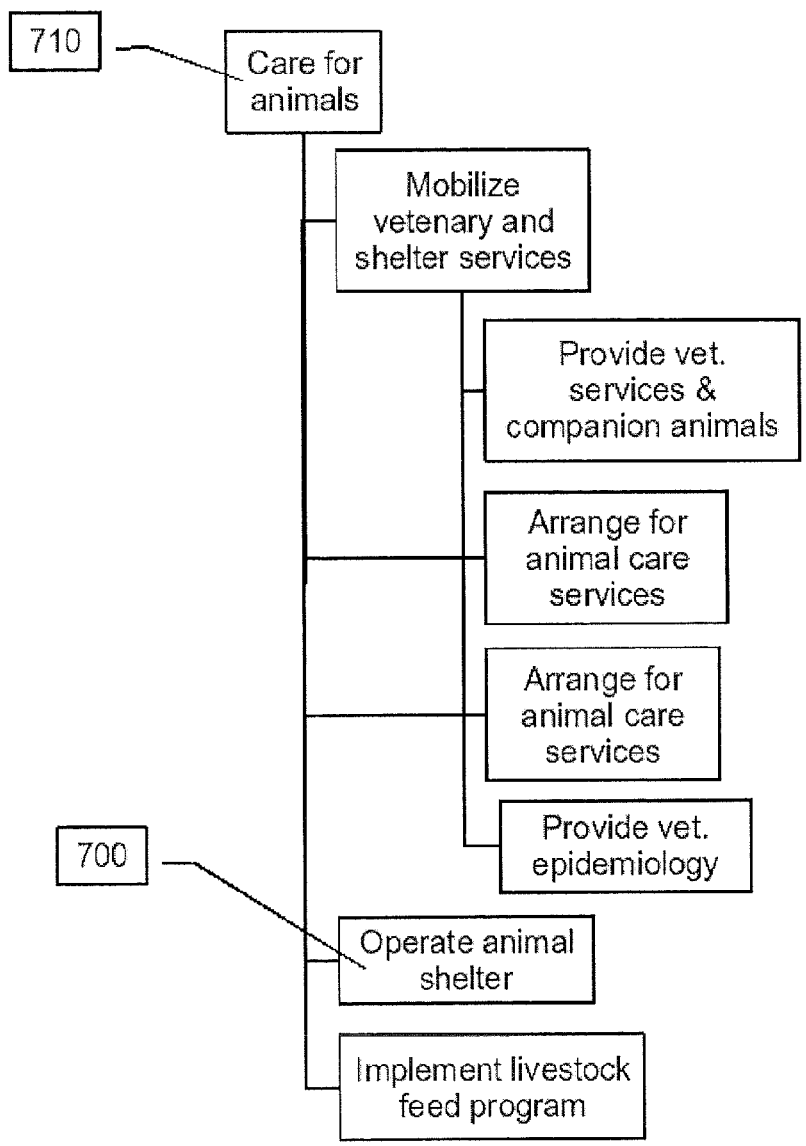
FIG. 7 is a drawing that gives an example of task categories.

A participant or domain expert can, in defining categories, list the other categories it implies as illustrated in FIG. 7. For example, a "Operate animal shelter" task 700 can be said to imply a "Care for animals" task 710, meaning that operating an animal shelter is always caring for animals but caring for animals is not always operating an animal shelter. Thus when a "Operate animal shelter" category is affixed to a task in a scenario, the "Care for animals" category is also implicitly affixed.

When adding a category to a taxonomy, one denotes the discipline this category belongs to. It may belong to disciplines such as law enforcement, health, government, business continuity, or none at all. Different categories can share the same name but only if they belong to different disciplines. An organizational role, a task, an event etc. belongs to a discipline if it belongs to a category in that discipline. Something can belong to multiple disciplines if it is given, directly or indirectly, more than one category, each from a different discipline.

For example, a task categorized as "forensic autopsy" would belong to the "law enforcement" discipline because the "forensic autopsy" category is assigned to the "law enforcement" discipline. But the task would also belong to the "medicine" discipline because "forensic autopsy" implies the category "autopsy" which belongs to the discipline "medicine". Thus, performing a forensic autopsy puts a medical examiner at the intersection of the law enforcement and medicine disciplines.

Categories are needed to match profiles and scenario elements. For example, when events are added to a scenario, categories are used to match these events with those that would trigger or terminate a situation. A match causes a situation to either come into effect or to end.

For example, adding an event categorized as "quarantine" triggers an "area quarantined" situation. The "quarantine" event thus effectively stops all mail deliveries in the quarantined area, removing one means of information sharing. The United States Postal Service communication channel then becomes inoperative until the situation terminates with the end of the "quarantine" event.

Categories are also used to determine whether an organizational role fits the definition of an agent executing a task. For example, "All 'county health officers' (a role category) in NJ estimate vaccine supplies" would apply to a particular Public Health Officer (a role) in Morris County of New Jersey (an organization), among others.

What can be known about an "avian flu fatality" event is not the same as what can be known about a "fire in the building" event. What can be known about a "set up vaccine point of distribution" task is different from what can be known about an "autopsy" task, and so on. The category used to classify an event ("avian flu fatality" vs. "fire in the building") or anything else carries with it what's knowable and thus communicable.

According to the method, each category is given an "information template" to capture what can be known and communicated about something belonging to this category. An information template (e.g., a form not yet filled out) is composed of "elements of informations" or EOI. An EOI describes a unit of information, for example a "casualty count" or a "date of completion" (think of a field in a form). The EOI has a name and possibly some constraints on its values. For example, the value of a "casualty count" EOI is zero or more. EOIs can be grouped into "topics" (think of named sections in a form). Topics can have sub-topics of any depth (think sub-sections in a form).

For example, FIG. 8 shows what could normally be communicated about an event categorized as a "car accident" (and possibly stored in some accident reporting system).

Secrecy and privacy constraints can be associated with a topic. For example, an accident victim's identity may be private but not the data about the vehicle.

This information template extends the one associated with the implied category "accident" as shown in FIG. 9.

Furthermore, this information template extends what can be known about any kind of "event", such as date, cause, etc.

Given the information templates associated with the event categories "road accident", "accident" and plain "event", and given that a road accident is an accident and that an accident is an event, one can aggregate all the above EOIs to encompass what could be normally be communicated about a road accident.

When an information template is used, say to describe a "need to know", a participant selects which EOIs apply from an aggregated information template (what exactly needs to be known amongst all that could be). The participant may even add other, ad hoc EOIs beyond those in the information template. Such idiosyncratic EOIs are less likely to be matched with descriptions of what is known because they are not part of a shared vocabulary and, as such, are unexpected. It is thus preferable to extend information template associated with categories rather than use ad hoc EOIs.

In the preferred embodiment, the work of defining information templates and the categories they inform is normally done by domain experts. Categories and their information templates are available to participants in communications planning projects who simply reference them to define task, events etc. and to specify what is known and needs to be known about them by selecting EOIs.

Domain experts and, when needed, participants define common situations and policies that can impact information sharing across many scenarios. A situation represents a set of circumstances (they are not specified), that are triggered by events and cause resources such as communication channels or even entire organizations to change their normal operational status. A situation can also represent a context in which information sharing constraints imposed by policies are relaxed or exceptionally enforced. Or it can represent both.

A situation includes a list of resources that become operational or non-operational for the duration of the situation. It also includes a list of policies that either become effective or ineffective for the duration of the situation. Finally, a situation is defined in terms of the kinds of events that trigger it and terminate it. If no terminating event is provided, then the end of the triggering event signals the conclusion of a situation.

Situations can be defined for reuse across projects or they can be defined on a per-scenario basis. For example the "Terror alert red" situation removes some legal restrictions on sharing, and it is the same across projects. On the other hand, someone defining a scenario may want to create an ad hoc situation for the purposes of that scenario only.

Policies are laws, plans, mandates, directives etc. that mandate, restrict or enforce information sharing. Policies are defined first by naming and describing them in a few short sentences. A reference is then provided to the relevant text if available. Finally, the organizations that respectively issued the policy and enforce it are identified.

When sharing needs are analyzed, the policies in effect are examined to verify if they forbid or obligate such sharing. What policies are enforced may depend on what situations are in effect.

A location is a place where something can happen. The definition or specification of a location can be obtained from open source "gazetteers." or geographical dictionaries and reference materials.

Locations are categorized as an administrative area (city, county, state, country, etc.), a geographical area (lake, mountain, river etc.), a landmark, a place of business etc.

Any other location that directly contains it is identified. For example, a city is in a county which is in a state etc. The locations that share borders with it are also identified. Spatial coordinates (latitude, longitude) are provided to pinpoint a location on a map. An average radius can be given to indicate surface area.

Participants "bootstrap" scenarios by introducing one or more incidents. Incidents are events or tasks that are not caused by prior events, or tasks within the scenario. A scenario puts events, tasks and their end-products on a timeline that starts at "time zero." While events can be specific as to location and situations, there is no notion of absolute time in a scenario; everything happens relative to the beginning of the scenario.

However, when a scenario is analyzed, each resource involved is examined to verify that it is operational and can be contacted when needed (day, night, business day, week-end etc.). If not, an information sharing issue was uncovered.

When introducing an event or task into a scenario, a participant connects it to its cause (unless it's an incident). The cause is either the initiation or termination of a prior event or task. The participant can also specify a delay between the cause and the initiation of the caused event or task. A delay from the start of the scenario can be specified for incidents (since they have no stated cause).

The potential end-products of a task, namely created knowledge or artifacts, are similarly connected to the tasks that cause them, and a delay can also be specified between cause and effect.

Because events are probable outcomes, participants can state the likelihood of occurrence, 100% being the default.

Some events may be mutually exclusive. For example, a "fire is extinguished" event and a "fire is spreading" event can not happen together. Participants can assert that two events are mutually exclusive. Mutually exclusive events are usually outcomes of the same task or event ("after combating a fire, either it is extinguished or it spreads").

What happens subsequent to mutually exclusive events implicitly belongs to separate "timelines." These "parallel realities" obviously can not communicate with or know about one another. For example, knowledge produced as a consequence of a "fire is extinguished" event can not be available to agents doing a task that is caused, directly or indirectly, by the "fire is spreading" event.

Scenarios describe what could happen. They are canvasses onto which participants paint the "need to know" and "know" of the organizational roles involved.

Organizational roles become involved in a scenario by specifying the agents of tasks in that scenario. An agent of a task can be specified as an individual role ("the local fire chief"), or as a team acting as a unit ("the board of directors") or as multiple individuals in similar or identical roles, each executing the same task but separately ("all floor wardens evacuate their own floors").

Determining what individuals are the agents of a task may depend not only on their roles but also on the context of their task. For example, "when a building is on fire (event), the floor wardens (agents) above the fire (context) assemble employees to stand-by locations (task)." The specification of the agents must then include what information about roles and context determines who the individuals are (here, the information is the floor numbers from the "building on fire" event and the floor assignments from the fire-warden roles). This information would be needed in order to first identify these agents by anyone wanting to communicate with them.

Participants assert what information agents need in order to successfully execute their tasks. This information may come from "situational awareness", that is, knowledge of the context in which the task is being executed, or it may be some data to be retrieved from a repository, or it may be expert knowledge obtainable from some organizational role. Participants also assert how critical and urgent the needed information is, whether it should be "pushed" (notification) or "pulled" (request-response), and whether updates are wanted, either periodically or whenever the needed information changes.

Participants may also assert that an organizational role not (yet) associated with any task within the scenario needs information about what's happening in a scenario. In this case, the justification for needing the information (a task) is left unspecified.

Participants identify who would know what's happening in the scenario. An agent implicitly knows about the task it is executing and can communicate information about it and about artifacts it may create. Agents of a task also typically can communicate any new information the task produces. However an agent does not necessarily know about the events caused by a task. It is the participants' responsibility to identify who would know about the event without having to be told about it.

An organizational role can "opt out" from being included as an agent of a task. For example, an agent could be defined generically as "all county public health officers in NJ, with the exception of the Morris county public health officer."

Information produced by a task is often preserved in a repository for later retrieval. For example, accident information collected by policemen are quickly entered into an incident reporting system.

Participants identify what information is preserved in a repository, be it "situational awareness", for example the status of a task, or new information created by a task, for example a diagnosis from an autopsy. The repository is also identified and the kind of information that's preserved is described as an information template.

Participants may also indicate how long it would take for the information to become available for retrieval from the repository. The conditions and constraints under which information can be retrieved are provided as part of the repository's profile.

Participants apply the method to systematically capture and analyze how people in organizational roles need to communicate within hypothetical scenarios. From this analysis, participants uncover information sharing issues and produce communication plans.

The method defines a systematic process for doing needs-based communication planning. It organizes and relates individual activities carried out by the participants of a communications planning project. The activities can be grouped thematically. While the grouping suggests an overall, logical progression, the process is a flexible and iterative one. No fixed sequencing of activities is imposed beyond the fact that most build on the output of prior activities.

Many activities can be pursed on an opportunistic basis, constrained only by end-products of prior activities and guided by the participants' collective intent.

Groups of activities identified in the preferred embodiment of the invention are Framing, Profiling, Modeling, Defining, Discovering, Assessing and Planning.

"Framing" activities are directed at setting the scope, missions, participation and structure of needs-based communication planning projects.

"Defining" activities are directed at growing a shared vocabulary for categorizing resources and scenario elements, and for describing what can be known about them. They are also directed at identifying and describing common situations and policies.

"Profiling" activities are directed at describing the actors and sources of information (resources) that can be involved in scenarios.

"Modeling" activities are directed at building scenarios from initial incidents and making assertions about what information is needed and produced as a consequence.

"Discovering" activities are directed at examining scenarios and the resources involved in order to uncover and qualify sharing needs, the communication plans that satisfy them and the issues that frustrate them.

"Assessing" activities are directed at analyzing the impacts of information sharing issues, detecting risks of communication bottlenecks and points of failure, and evaluating information sharing capability.

"Planning" activities are directed at producing and validating communication plans for each scenario and organizational role. They are also directed at assembling sharing agreements and prioritizing issue resolutions.

Most activities can be repeated and revisited many times in the course of a project. An activity, such as profiling a given organizational role, could be minimally carried out at first and then completed over time, as needed. There may be no set point at which a project is formally complete. A communications planning project executed using the method can be open-ended. It may be stopped at any point but should remain active for as long as up-to-date communication plans are required and information sharing issues need to be uncovered and resolved.

Activities often involve naming, describing and categorizing. When naming a project, resource, scenario element etc. care should be taken to use an unambiguous and widely accepted name. A description is a short text that conveys meaning and intent. Categorizing is done by affixing category names taken from the appropriate taxonomy. For example, events are categorized using event categories, such as "accident", "disaster", "man-made disaster" etc., taken from the event taxonomy. A taxonomy represents shared vocabulary that can be extended as needed by participants.

Another recurrent component of activities is the description of information that is needed, known or communicated. What is described is the nature of the information, not actual information. Information is described by listing elements of information (EOI), grouping them and possibly assigning classifications, privacy constraints and accuracy levels to each group. A group of EOI (a topic) may contain sub-groups (sub-topics). An element of information has a name (e.g. "the victim's age") and, optionally, a range of acceptable values (here, between 0 and 120).

Many activities in the method make use of shared vocabulary produced by "Defining" activities. The dependency between a wide variety of activities and "Defining" activities is implied in the illustrations describing activities of the method.

Figure 11:
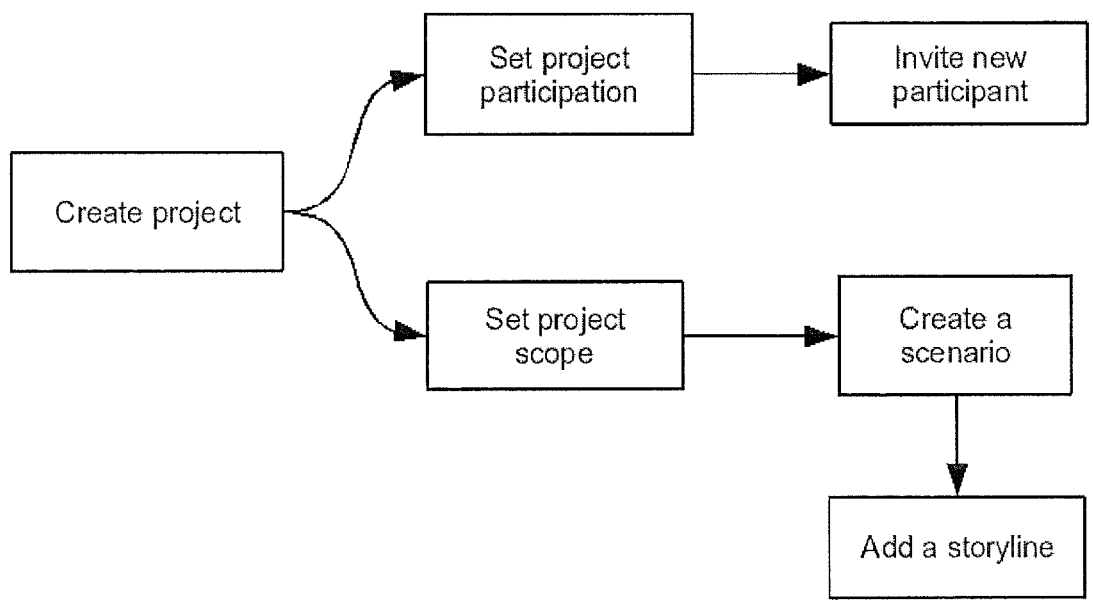
FIG. 11 is a flowchart describing how the execution of Framing activities can require the outcomes of other activities.

Participants carry out Framing activities to set the scope, missions, participation and structure of a project. Framing activities are executed when setting up a project and anytime afterward in order to grow the project's scope and range. Framing activities include Create Project, Set Project Participation, Create a Scenario, Add a Storyline, Invite New Participant. Reference is made to FIGS. 10A and 10B for definitions of the Framing activities. Reference is made to FIG. 11 for a description of how Framing activities can depend on the outcome of other activities.

In the preferred embodiment, participants use a shared vocabulary of categories for classifying resources and the contents of scenarios, and for describing what can be known about them. This shared vocabulary is defined as an outcome of Defining activities. While participants can add to this shared vocabulary, it is expected that Defining activities would be carried out by domain experts. Defining activities include Define a Category, Associate Information Template with a Category, Define a Location, Define a Policy, and Define a Situation. Reference is made to FIGS. 12, 13 and 14.

Figure 15:
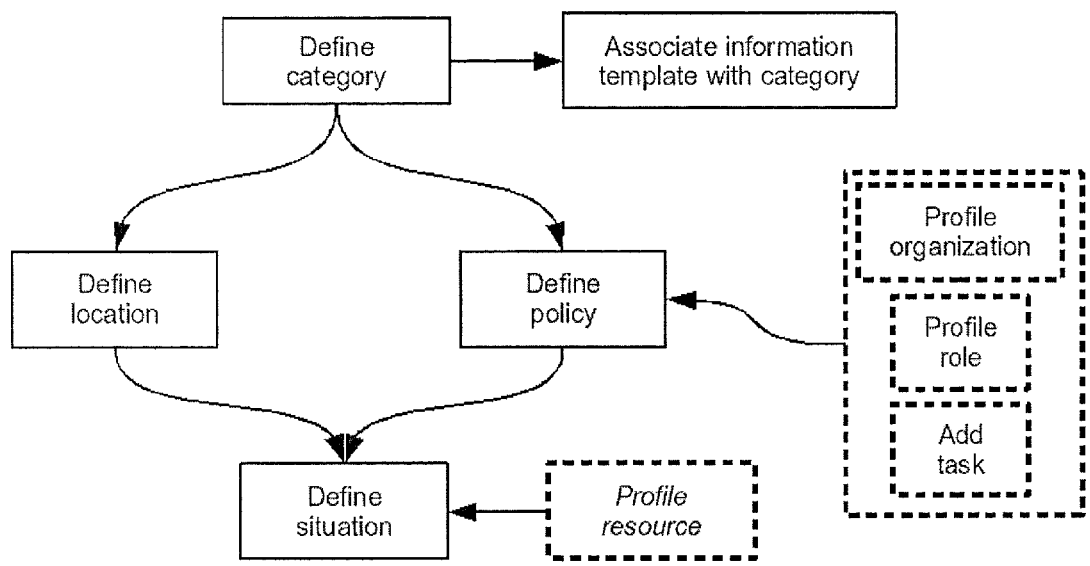
FIG. 15 is a flowchart describing how the execution of Defining activities can require the outcomes of other activities.

Reference is made to FIG. 15 for a description of how Defining activities can depend on the outcome of other activities.

Figure 19:
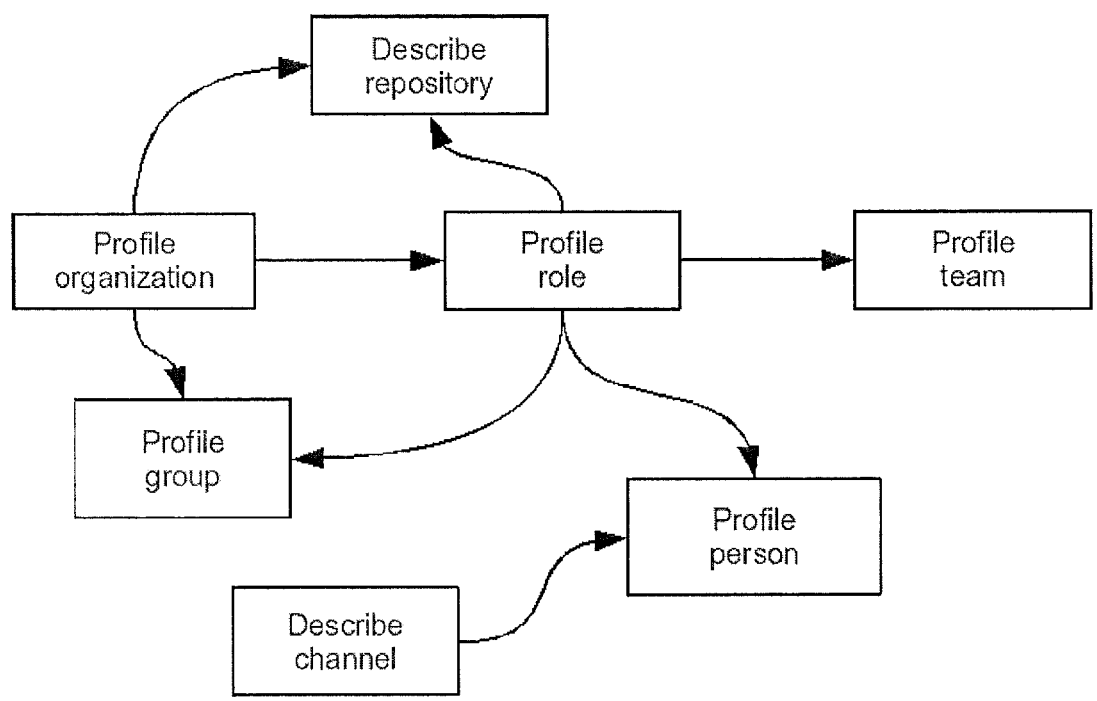
FIG. 19 is a flowchart describing how the execution of Profiling activities can require the outcomes of other activities.

Participants carry out Profiling activities to describe the actors and sources of information (resources) that can be involved in scenarios. Resources can be profiled before being referenced in scenarios, or "just in time". A resource can be re-used across projects, so its definition does not belong to one particular project. Rather, it belongs to any participant authoritatively representing this resource or the organization administering it. Profiling activities include Profile an Organization, Profile a Role, Profile a Team, Describe a Channel, Profile a Person, Profile a Group, and Describe a Repository. Reference is made to FIGS. 16A, 16B, 16C, 17A, 17B, 17C and 18. Reference is made to FIG. 19 for a description of how Profiling activities can depend on the outcome of other activities.

Figure 25:
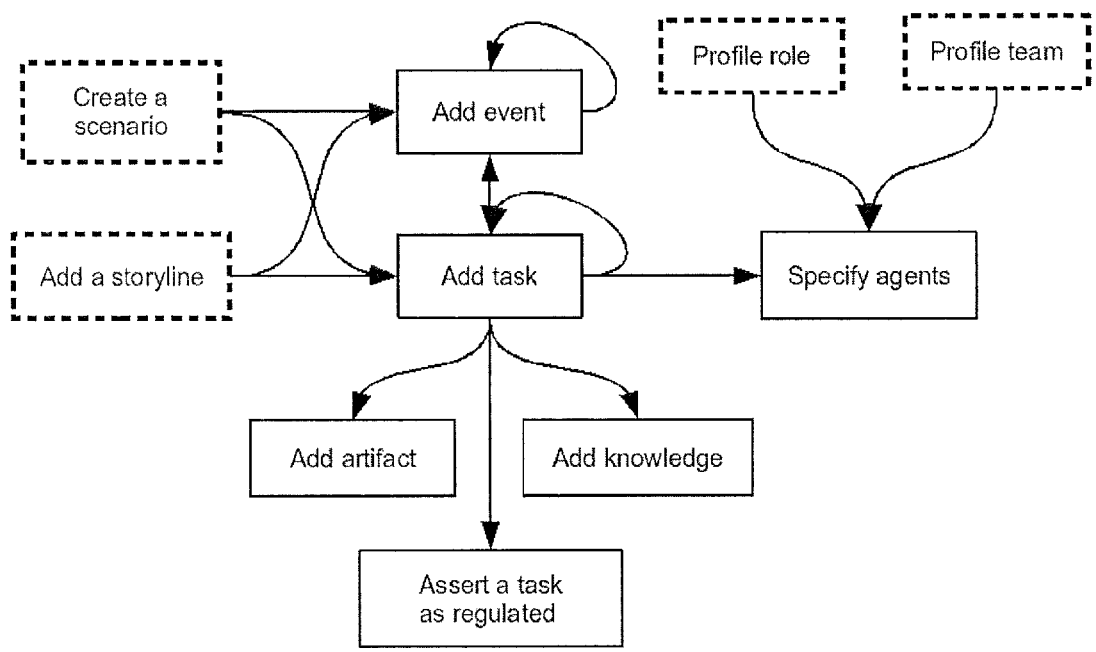
FIG. 25 is a flowchart describing how the execution of Modeling activities can require the outcomes of other activities.
Figure 26:
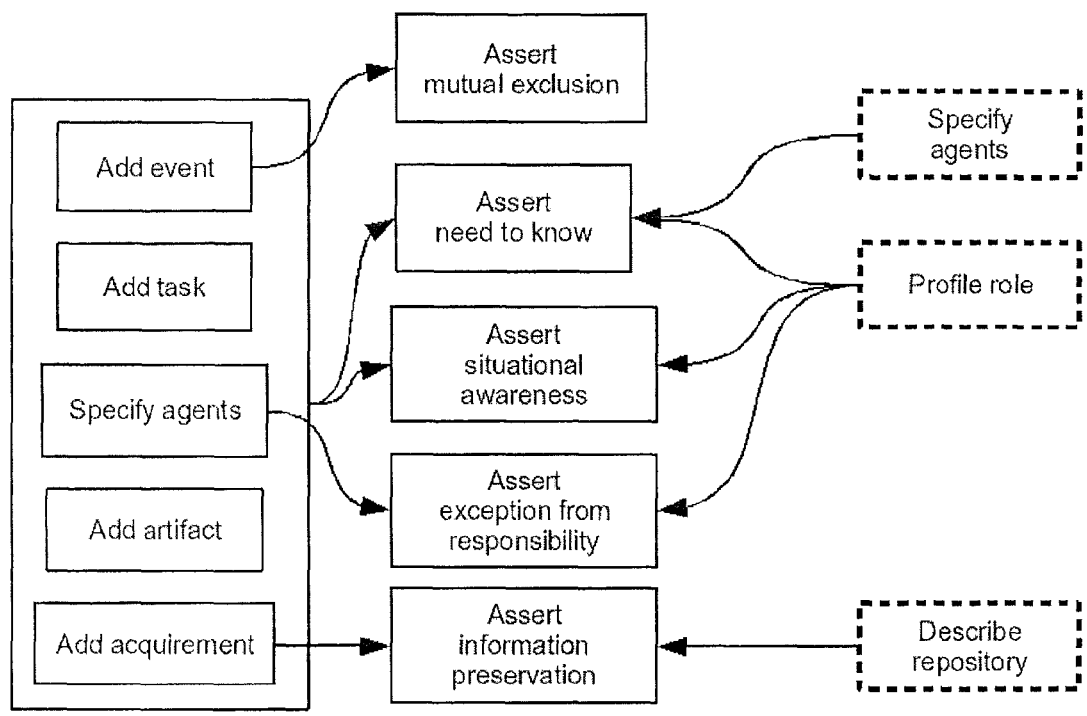
FIG. 26 is a flowchart describing how the execution of additional Modeling activities can require the outcomes of other activities.

Participants carry out Modeling activities to build scenarios from incidents (events and tasks that are not caused by other events and tasks represented in the same scenario) and make assertions about what information is needed and produced as a consequence. The Modeling activities include Add an Event, Add a Task, Specify Agents for a Task, Add a Task-Produced Artifact, Add a Task-Produced Knowledge, Assert a Need to Know, Assert Situational Awareness, Assert Information Preservation, Assert Mutual Exclusion of Events, and Assert Exception from Responsibility. Reference is made to FIGS. 20A, 20B, 21, 22, 23, 24A and 24B. Reference is made to FIGS. 25 and 26 for a description of how Modeling activities can depend on the outcome of other activities.

Figure 34:
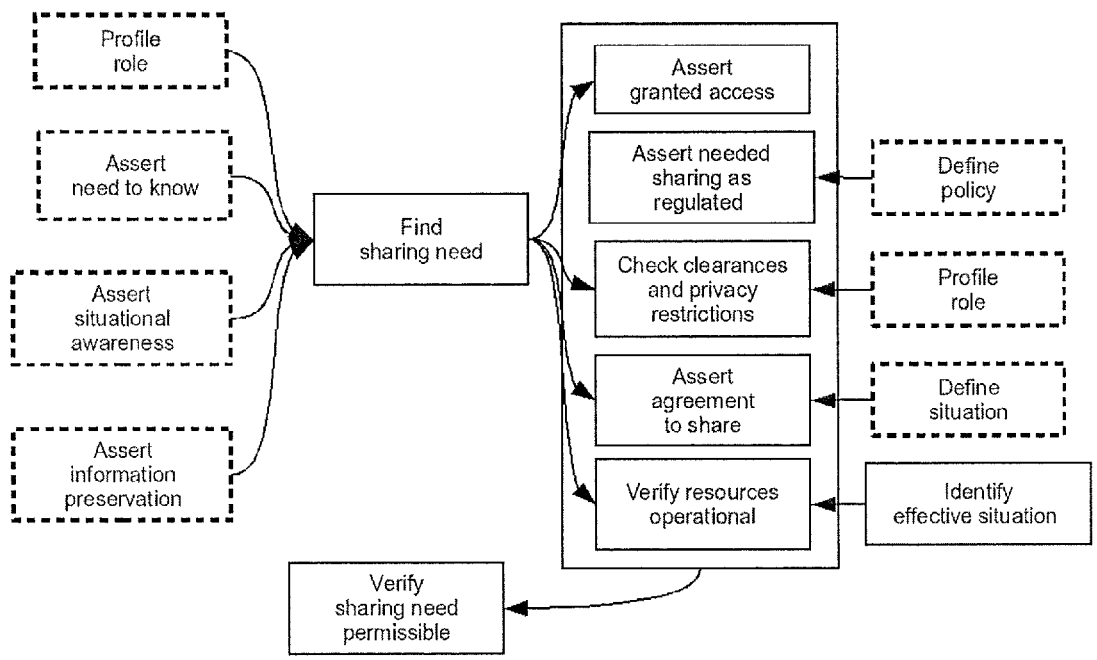
FIG. 34 is a flowchart describing how the execution of Discovering activities can require the outcomes of other activities.
Figure 35:
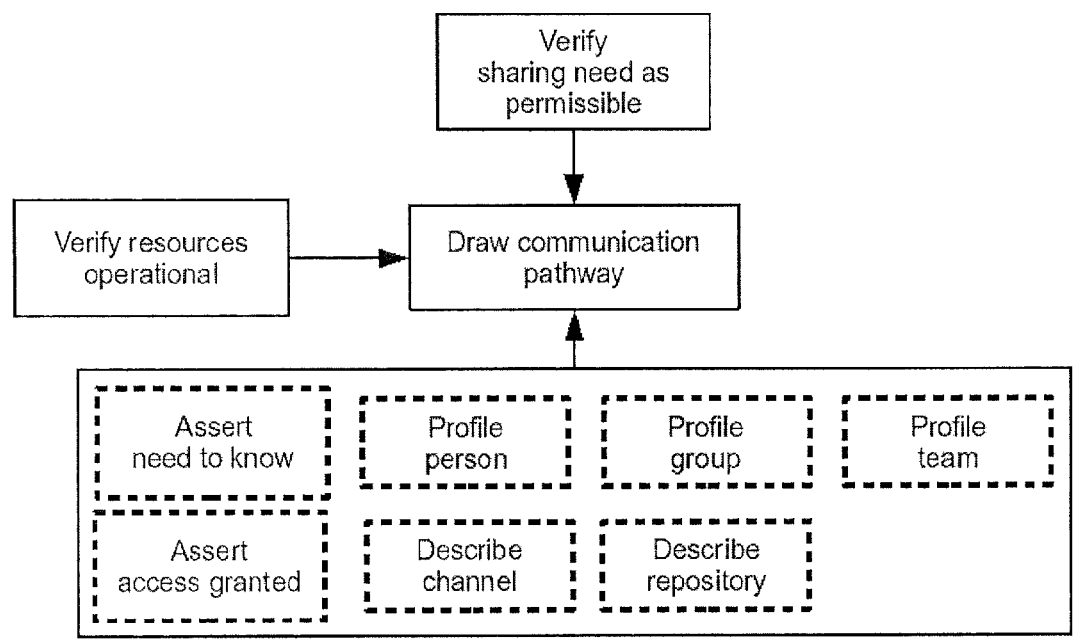
FIG. 35 is a flowchart describing how the execution of additional Discovering activities can require the outcomes of other activities.
Figure 36:
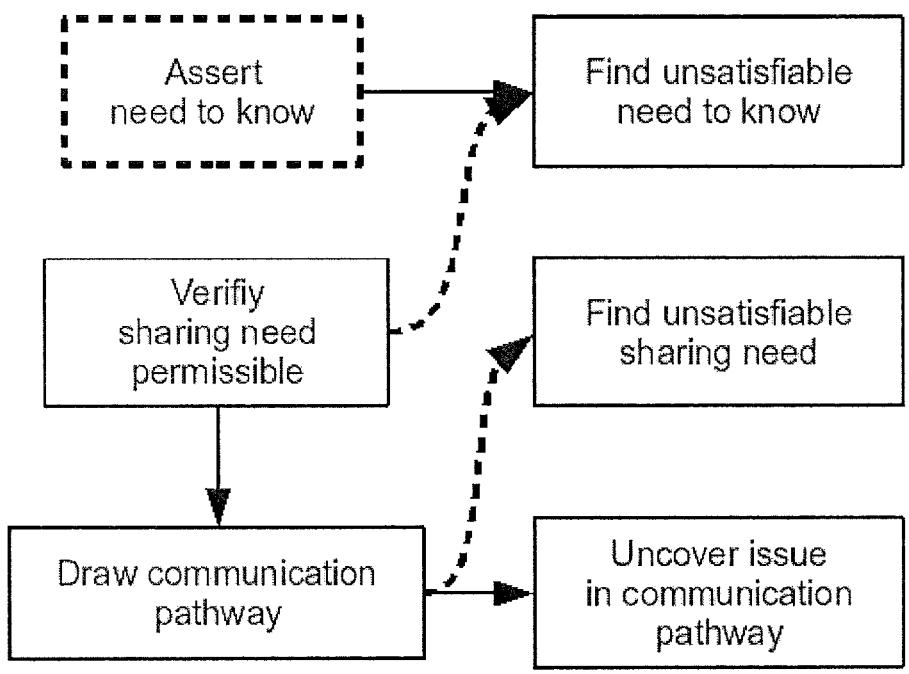
FIG. 36 is a flowchart describing how the execution of additional Discovering activities can require the outcomes of other activities.

Participants carry out Discovering activities to examine scenarios and the resources they involve to uncover and qualify sharing needs, to propose communication plans that satisfy them, and to uncover any issues that frustrate them. The Discovering activities include Find a Sharing Need, Assert Granted Access, Assert Agreement to Share, Check Clearance and Privacy Restrictions, Identify an Effective Situation, Verify that Resources are Operational, Assert a Task as Regulated, Assert Needed Sharing as Regulated, Verify Needed Sharing as Permissible, Draw a Communication Plan, Find an Unsatisfiable "Need to Know", Find an Unsatisfiable "Sharing Need", and Uncover an Issue in a Communication Plan. Reference is made to FIGS. 27A, 27B, 28, 29, 30, 31, 32 and 33. Reference is made to FIGS. 34, 35, and 36 for a description of how Discovering activities can depend on the outcome of other activities.

Figure 39:
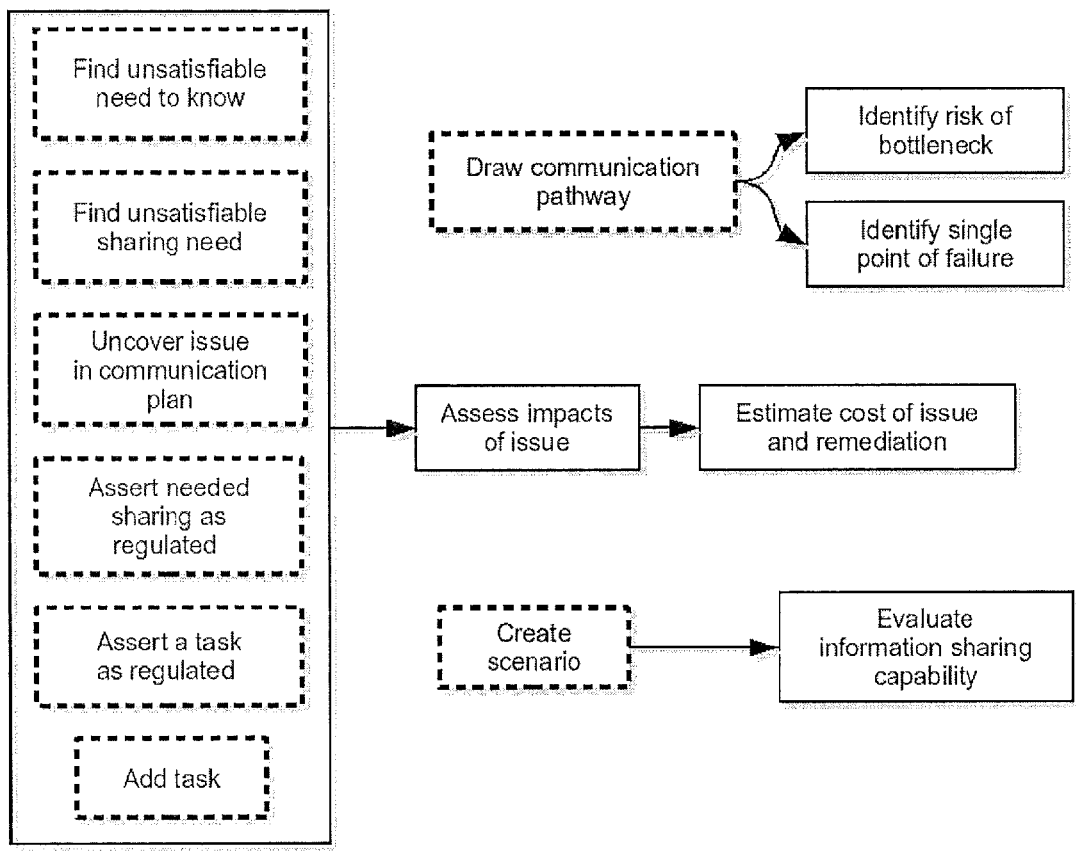
FIG. 39 is a flowchart describing how the execution of Assessing activities can require the outcomes of other activities.

Participants carry out Assessing activities to do impact analysis on information sharing issues, detect risks of communication bottlenecks and points of failure, and evaluate information sharing capability. The Assessing activities include Assess the Impacts of an Issue, Estimate the Cost of an Issue and of its Remediation, Identify a Bottleneck Risk, Identify a Single Point of Failure Risk, and Evaluate Information Sharing Capability. Reference is made to FIGS. 37A, 37B and 38 for definitions of the Framing activities. Reference is made to FIG. 39 for a description of how Assessing activities can depend on the outcome of other activities.

Figure 43:
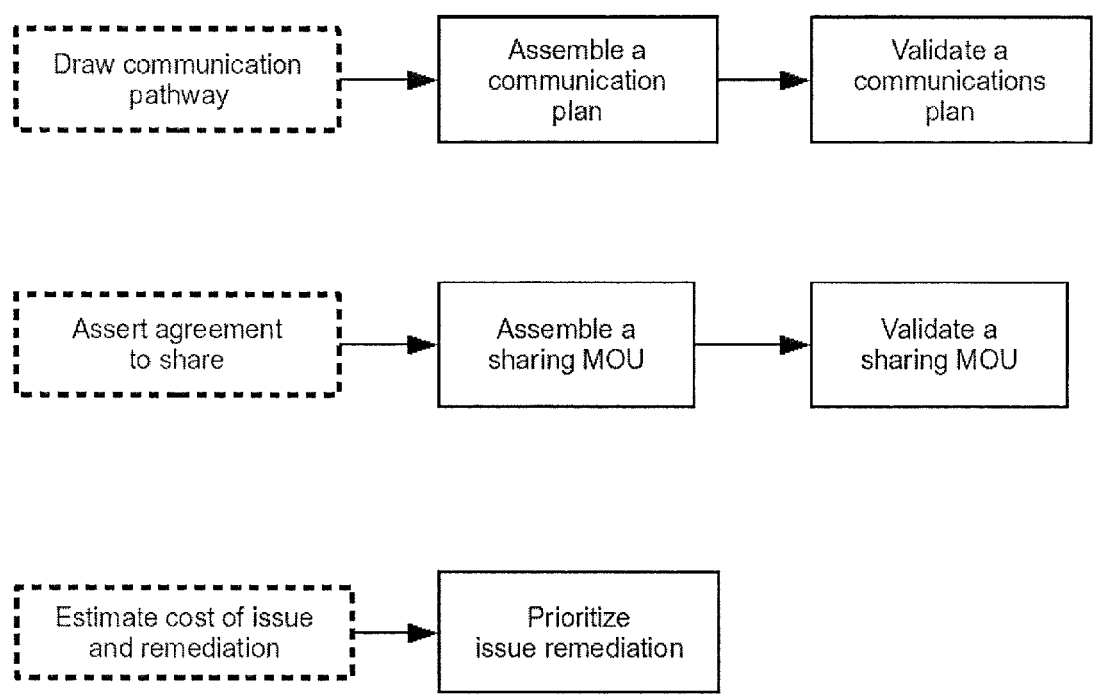
FIG. 43 is a flowchart describing how the execution of Planning activities can require the outcomes of other activities.

Participants carry out Planning activities to produce and validate communication plans for each scenario and organizational role, assemble and validate sharing agreements, and prioritize remediations for issues. The Planning activities include Assemble a Communication Playbook, Validate a Communication Playbook, Assemble a Sharing MOU, Validate a Sharing MOU, and Prioritize Issue Remediation. Reference is made to FIGS. 40, 41A, 41B and 42 for definitions of the Planning activities. Reference is made to FIG. 43 for a description of how Assessing activities can depend on the outcome of other activities.

In the preferred embodiment of the invention a system comprised of a programmed processor with appropriate instructions in memory supports participants in the collaborative execution of the method's Framing, Defining, Profiling, Modeling, Discovering, Assessing and Planning activities.

The system captures, records and displays data about shared vocabulary, project definitions, resource communication and information provision capabilities, about scenarios, their storylines and their component events, tasks, task agents, task-produced knowledge artifacts, and assertions of scenario-driven information needs.

The system analyzes the above data to uncover, record and display information sharing needs. The system captures, records and displays participant-provided data about these sharing needs including accessibility by intended recipients of needed information to the sources containing the information, agreements by the sources to share the information and policies obligating or interdicting the satisfaction of these sharing needs.

The system analyzes each sharing need in conjunction with all other relevant data it recorded in order to generate, record and display communication plans that, if realized, could each satisfy the sharing need. The system analyzes communication plans, sharing needs and information needs to identify issues as information needs that, according to the data recorded, could not be satisfied (no associated, agreed-to and permissible sharing need) or could be at risk of not being satisfied (failure-prone communication plans).

The system analyzes the issues and all relevant, recorded data to identify, record and display, for each issue, the tasks in a scenario that could fail as a consequence of the issue preventing the satisfaction of information needs. The system captures, records and displays the probabilities and severities of failures for the impacted tasks as provided by the participants.

The system captures participant requests and analyzes all recorded data to generate reports and documents that include Resources Directories, Information Flows, Communication Plans, Communication Playbooks, Notification Scripts, Issue Impacts Analysis, Issues Remediation Plans, Information Sharing MOUs (memorandum of understanding), and Information Sharing Capability Assessments.

Note that these and other reports and documents could also be produced manually and at significantly greater costs from the inspection of the data gathered by the application of the method.

The resources directory is a combination of "White Pages" and "Yellow Pages". It aggregates profiled information resources, namely persons in organizational roles, teams and repositories, according to the information they can provide.

A Resource Directory can be personalized for a given organizational role. Its contents include the identity of the resource, the organization it's in, the kind of information it needs and can provide, how to access it and when it can be accessed, and whether it can be accessed directly by the organizational for which this directory is prepared.

The resources can be organized in different ways based on resource type, organization, information needed and provided, and events that trigger communications.

Figure 44:
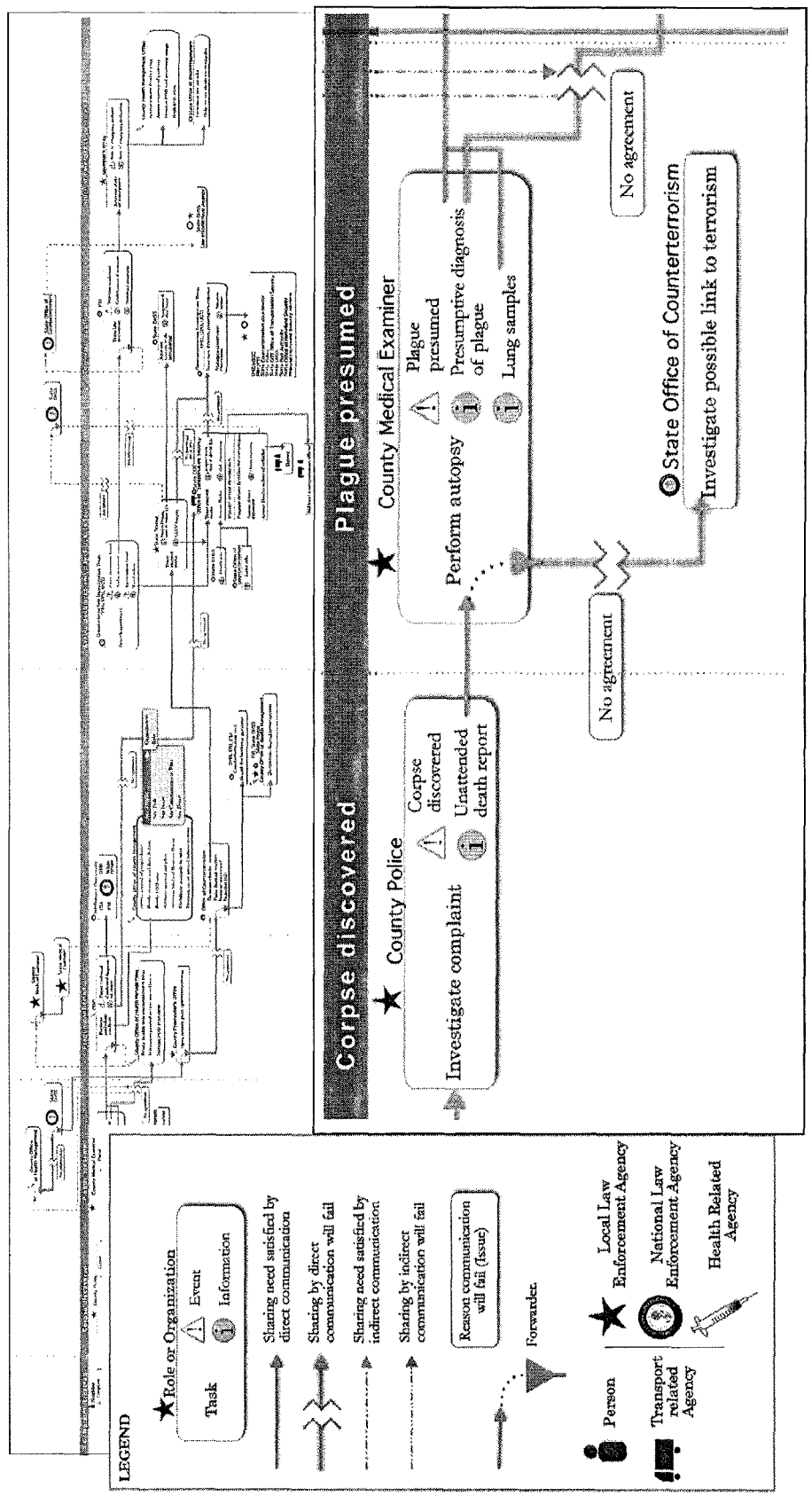
FIG. 44 is a drawing of an information flow report.

An Information Flow, as illustrated in FIG. 44, provides the information sharing "big picture" for a single storyline in one scenario or for all storylines in a scenario. It is derived from the information sharing needs uncovered in scenarios and from "orphaned" information needs (those without matching sources of information). It shows how information should flow and where it can't. Issues that prevent flows are overlayed on the map.

A Communication Plan shows many ways in which an information sharing need can be satisfied. An information sharing need is fulfilled by the direct or indirect transmission of needed information from source to recipient.

Figure 45:
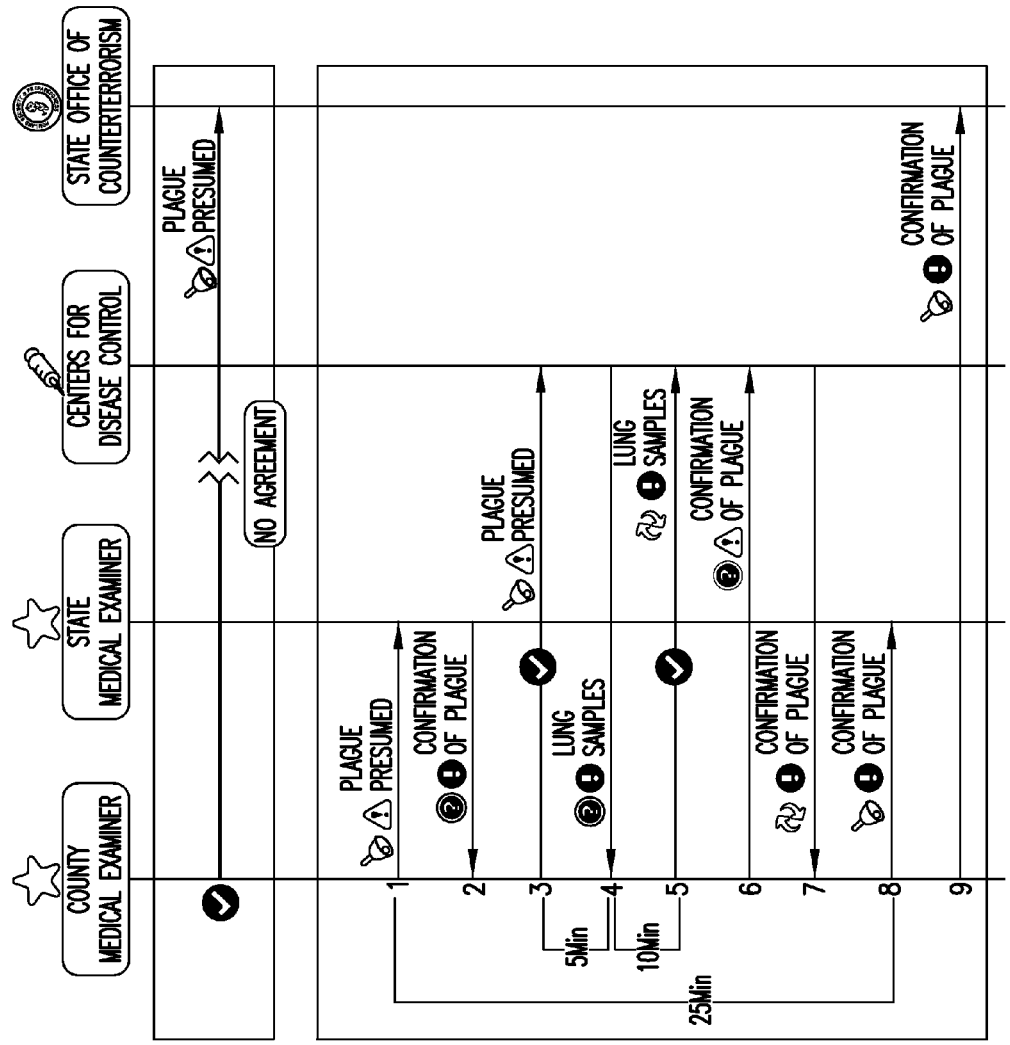
FIG. 45 is a drawing of a communication plan report.

As illustrated in FIG. 45, fulfilling a sharing need may require a sequence of notifications, requests, and responses, possibly going through a number of intermediates. There may be alternate sequences, each providing an alternate path to deal with communication failures and to provide for escalation procedures. Some sequences are preferable to others for reasons of security, reliability or latency.

The communication sequences that can satisfy an information sharing need together form a communication plan.

A Communication Playbook may be generated so as to tell a person occupying one or more organization roles what incoming and outgoing communications to expect based on scenarios. It is meant to be printed out and used in the field.

A Communication Playbook can take a role-centric view of communication and list the "acts of communication" expected of someone who is in a given organization role: Who to notify or ask questions when a given event happens, what inbound communications to expect after some event and what information to prepare in anticipation of a request, who to contact to get needed information when engaging in a response task etc.

Figure 46:
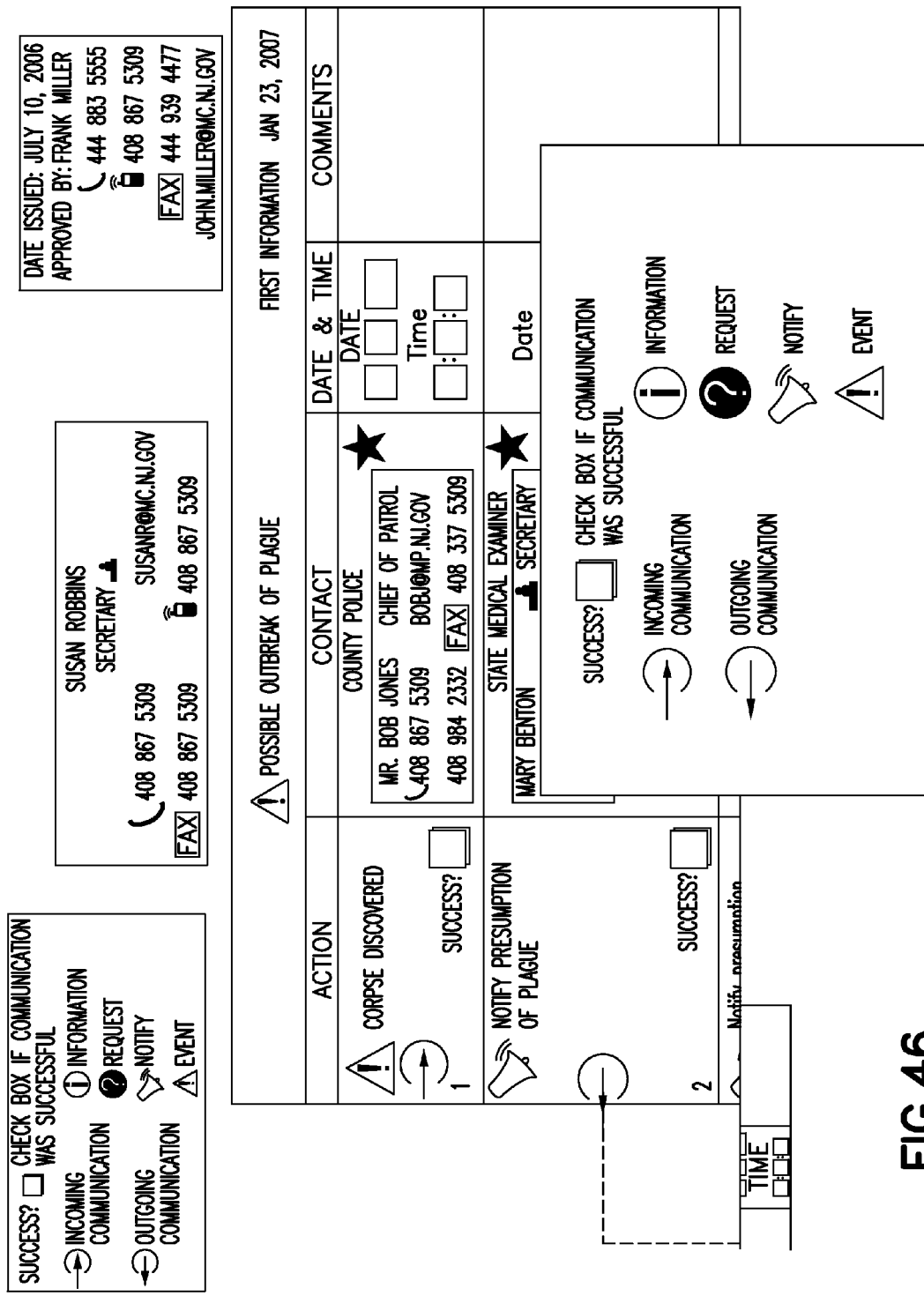
FIG. 46 is drawing of a communication playbook report.

As shown in FIG. 46, a Communication Playbook provides the necessary contact information and alternates means of contact. It can be indexed and formatted so as to be an effective communications guide in times of crisis.

A role's communication responsibilities may entail the repetitive notification of a large number of individuals. The relevant parts of an organizational role's communication plans in one or more scenario can be exported as notification scripts (possibly as XML files) for use by notification management systems.

One benefit of participating in a needs-based communication planning project is a deeper understanding of one's importance in the overall flow of information. A failure to communicate may have local, regional or even global consequences that may cross many discipline and jurisdiction boundaries. Understanding how the impacts of a failure to share can propagate helps bring a much needed perspective.

Figure 47:
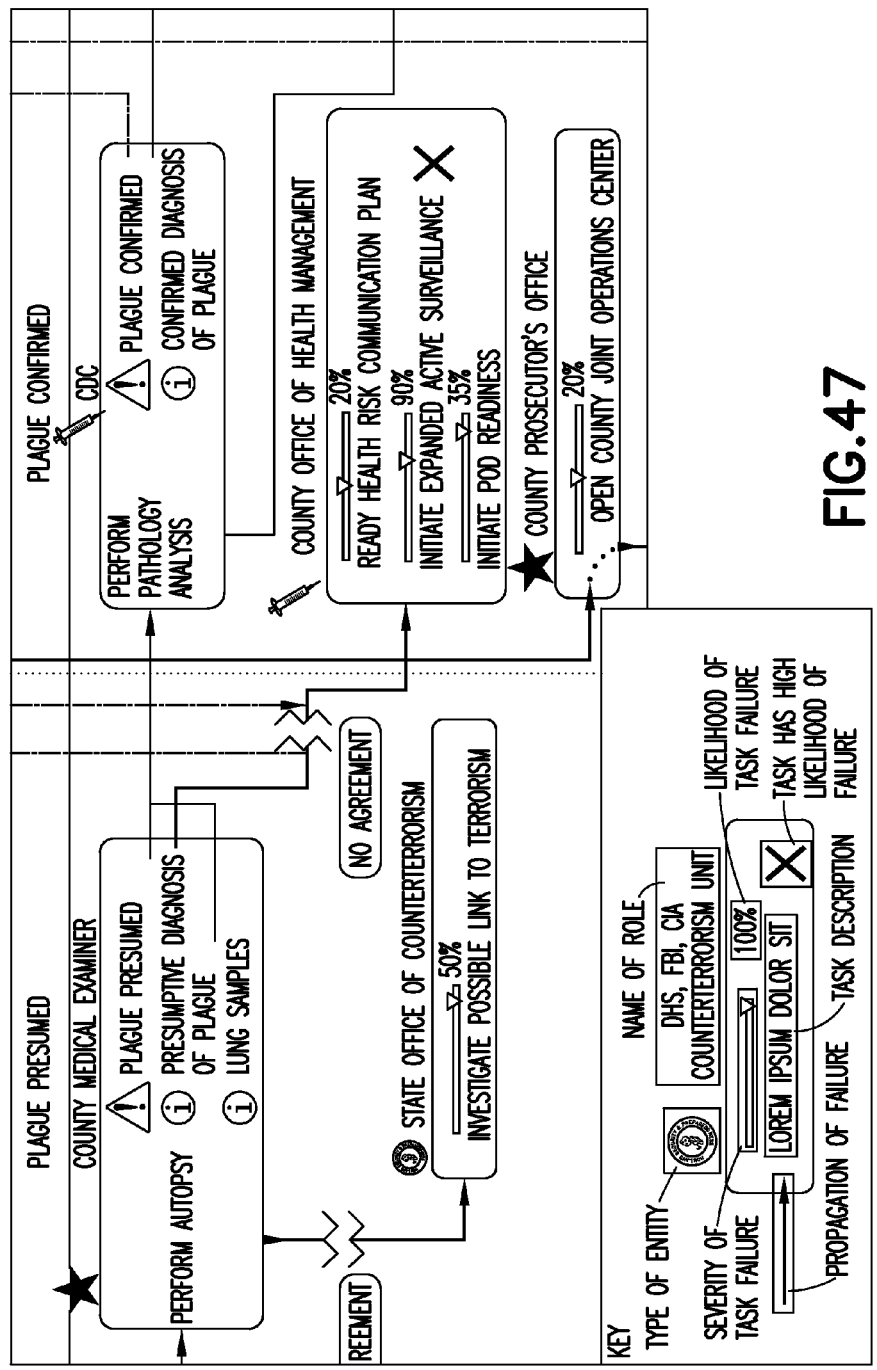
FIG. 47 is drawing of an issue impacts analysis report.

An Issue Impacts Analysis shows how an unremediated information sharing issue can impact response tasks immediately as well as "downstream" through propagation of failures. As shown in FIG. 47, the analysis can display the severity of each caused task failure as well as the likelihood of failure.

Multiple Information Sharing MOUs (memorandum of understanding) may be produced for an organization, each containing all the sharing agreements it has with another organization. An MOU lists all uncovered sharing needs within a project that involve a given pair of organizations, with either one acting as the source and the other as recipient.

The list can be organized by source and recipient organization, by scenario, by the kind of information shared and by the criticality of the information need.

An Information Sharing Capability report is a collection of measurements, that together paint a picture of an organization's ability to satisfy its own information needs as well as those of other organizations in various scenarios. It is a multi-dimensional measurement. Information sharing capability can not be meaningfully reduced to a simple rating such as a B+ or C−.

A project is at best an imperfect and incomplete source of data for measuring an organization's information sharing capability. For one thing, the scenarios are always works in progress, some more complete than others. Also, a scenario's scope limits the organizations that can be represented, thus not necessarily capturing all of the information sharing an organization would be involved in.

With these caveats firmly in mind, capability metrics can be useful when taken repeatedly over the course of a project and viewed in time series in order to reveal upward or downward trends. Metrics can also be aggregated by discipline or jurisdiction to provide a larger-grained assessment and detect problem areas.

Figure 48:
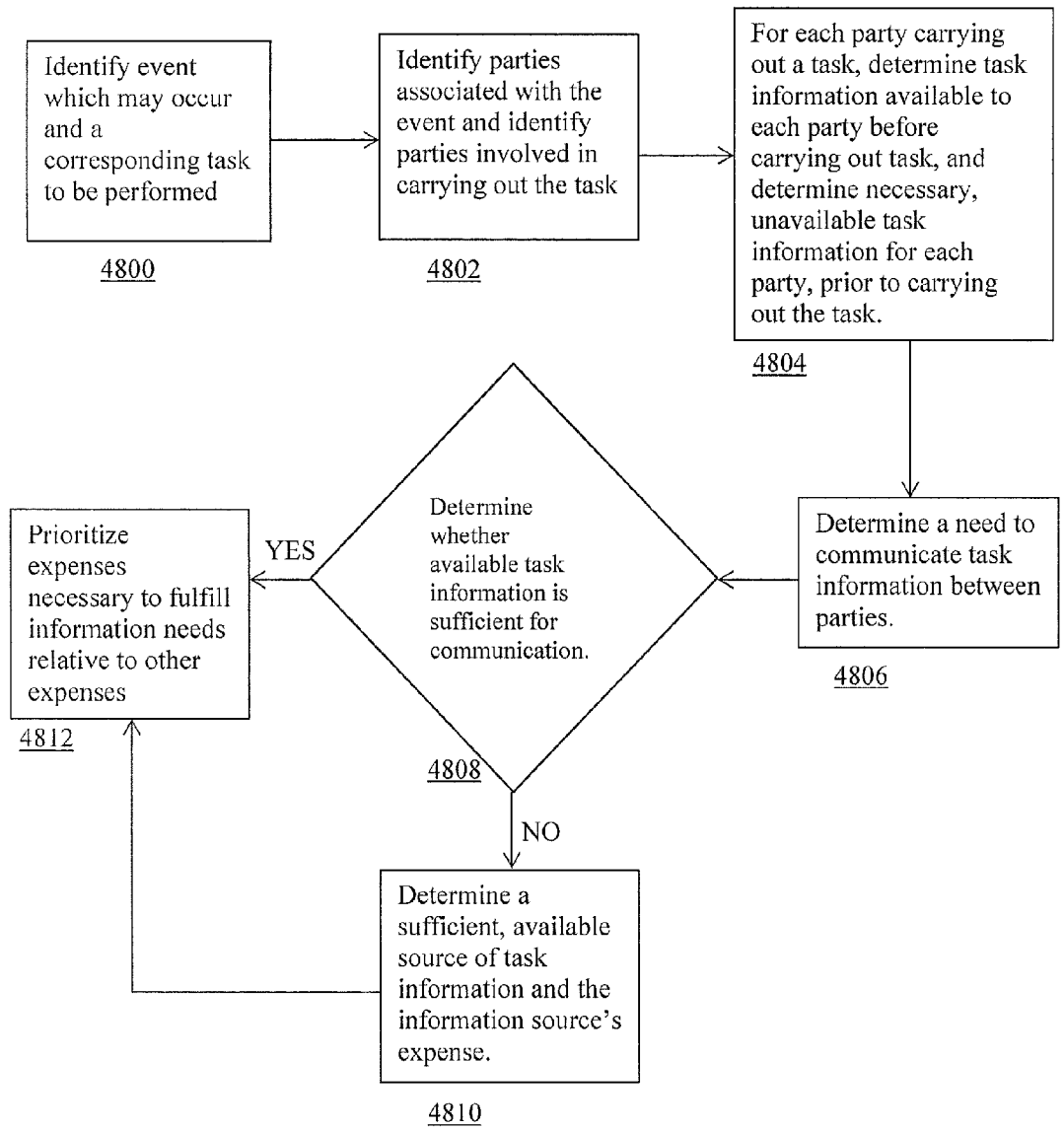
FIG. 48 illustrates a method for analyzing information transfer amongst parties.

FIG. 48 illustrates a method of analyzing information transfer amongst parties according to one embodiment of the invention. The method includes: identifying an event which may occur (4800), identifying the event's corresponding task (4800), and further identifying the parties responsible in carrying out the corresponding task (4802). Then, task information is determined for each party involved (4804). Then, it is determined whether the parties involved should communicate task information amongst each other (4806) and whether the task information is available for communication (4808). If task information is not available for communication, an appropriate information source and its corresponding cost is determined (4810). Lastly, the appropriate information source expense is prioritized relative to the other information expenses (4812). As will be appreciated by one of ordinary skill in the art, the steps of the method do not need to follow the sequence as depicted and described herein, and variations of the sequence of the steps are contemplated and encompassed in the appended claims.

Figure 49:
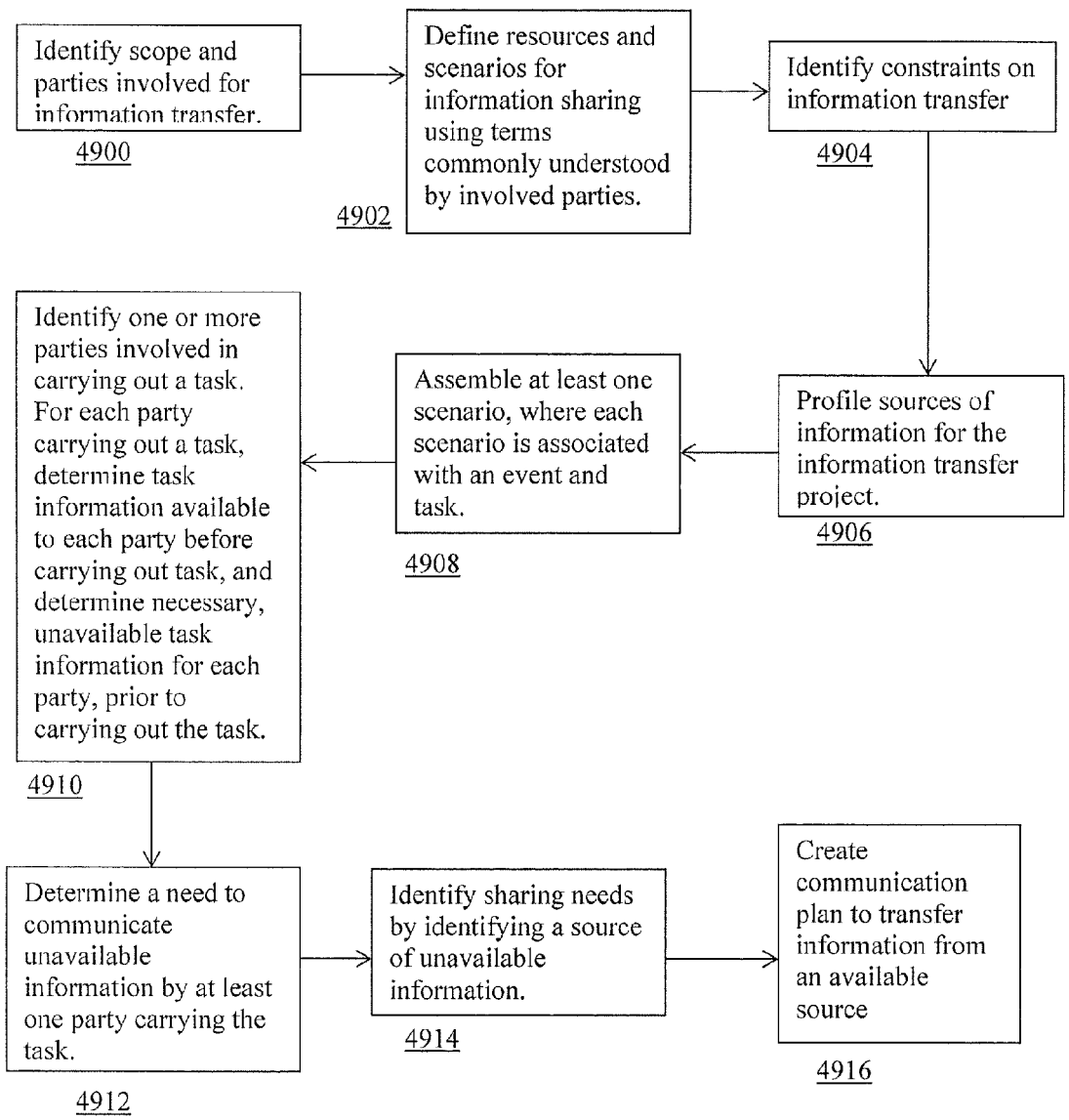
FIG. 49 illustrates another method for analyzing information transfer amongst parties.

FIG. 49 illustrates another method for analyzing information transfer amongst parties according to one embodiment of the invention. The method includes first identifying the scope as well as the parties involved in communicating information (4900), and further defining resources and scenarios using commonly used terms (4902). Next, transfer constraints are identified (4904) and information sources are profiled (4906). Then, scenarios are assembled (4908). Task information is then determined for each party involved (4910) and a need to communicate unavailable information is determined (4912). Lastly, sharing needs are identified (4914) and a communication plan is created to satisfy sharing needs (4916). As will be appreciated by one of ordinary skill in the art, the steps of the method do not need to follow the sequence as depicted and described herein, and variations of the sequence of the steps are contemplated and encompassed in the appended claims.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed:

1. A method for analyzing information transfer among a plurality of parties, the method comprising the following steps:

identifying an event which may occur, and in connection therewith identifying a task which needs to be performed based on said event occurring;

identifying one or more parties associated with said event, and further identifying one or more parties involved in carrying out said task;

for each party involved in carrying out said task, determining information available to each said party involved in carrying out said task prior to said task being carried out, and also determining information not yet available but necessary for carrying out said task for each said party involved in carrying out said task prior to said task being carried out;

determining a need for communication of information by one or more of said parties to carry out said task;

determining whether said need for communication of information may be fulfilled based on information available to each said party, and if said need for communication may not be fulfilled, then determining whether said information which is not yet available may be satisfied from an available source and determining a corresponding expense for satisfying said information need; and prioritizing said expense in relation to other expenses which may be necessary in fulfilling other information sharing needs.

2. A method for analyzing information transfer among a plurality of parties, the method comprising the following steps:

identifying the scope and parties involved in information transfer for a given information transfer project;

defining resources and scenarios for information sharing using terms commonly understood by said parties;

identifying constraints on the transfer of information;

profiling sources of information for the information transfer project;

assembling one or more scenarios, where each scenario is associated with an event and a task in response to said event;

identifying one or more parties associated with said event, and further identifying one or more parties involved in carrying out said task;

for each party involved in carrying out said task, determining information available to each said party involved in carrying out said task prior to said task being carried out, and also determining information not yet available but necessary for carrying out said task for each said party involved in carrying out said task prior to said task being carried out;

determining a need for communication of information not yet available by one or more of said parties to carry out said task;

identifying sharing needs by identifying a source of said as yet unavailable information;

creating a communications plan which satisfies said sharing need by transferring information from an available source of information to a party in need of said information available from said source.

3. The method of claim 2, further comprising the following steps:

defining a situation by performing at least the following steps:

describing the situation;

specifying at least one type of event that causes the situation to come into effect;

specifying at least one type of event that causes a termination of the situation;

identifying one or more resources which become operational for the situation;

identifying one or more resources which become non-operational for the situation;

identifying one or more policies which become applicable for the situation;

identifying one or more policies which become non-applicable for the situation.

4. The method of claim 2, further comprising the following steps:

describing a channel by performing the following steps:

determining whether the channel is normally operational;

identifying other channels interoperable with the channel;

determining the level of security and reliability associated with the channel;

identify a transmission latency for the channel.

5. The method of claim 2, further comprising the following steps:

verifying that an intended recipient of information possesses a necessary clearance for the needed information.

6. The method of claim 2, further comprising the following steps:

determining a sequence of communications to satisfy at least a part of an identified sharing of needed information, based on at least the following:

contact information of the source and intended recipient of the needed information;

access granted to the source and destination;

resources which are operational;

security and privacy of channels used;

information format supported by channels used.

7. The method of claim 2, further comprising the following steps:

creating one or more information sharing agreements among the one or more parties.

8. The method of claim 2, further comprising the following steps:

identifying an organization and a role for each party involved in said information transfer project.

9. The method of claim 8, further comprising the following steps:

profiling said role by performing the following steps:

determining whether the role is normally operational;

determining whether the role is internal;

determining whether the role is an accepted point of contact for the organization;

determining one or more managers for the role;

identifying one or more alternate roles to be contacted when the role is unreachable;

specifying the accessibility of the role; specifying the role's relevant expertise;

identifying one or more clearances a person in this role is to possess.

10. The method of claim 2, further comprising the following steps:

identifying a need for information which cannot be satisfied based on currently available resources.

11. The method of claim 10, further comprising the following steps:

identifying a cause for failing to provide needed information, the cause being one or more of secrecy, privacy, policy, absence of sharing agreement, excessive delay or insufficient rights.

12. The method of claim 2, further comprising the following steps:
assembling a communication playbook.

13. The method of claim 12, further comprising the following steps:
determining a selected scenario and a selected role identifying communication acts which involve the selected role for the selected scenario;
for each identified communication act:
identifying one or more events or tasks which directly result in said communication act; identifying constraints on said communication act;
identifying a person to be contacting said role and a person to be contacted by said role;
identifying contact information; identify at least one person to contact in the event of a failure of communication.

14. The method of claim 2, further comprising the following steps:
performing an impact analysis on said communication plan to identify one or more communication problems, wherein said communication problems include one of a communication bottleneck and a communication single point of failure.

15. The method of claim 14, further comprising the following steps:
selecting an issue and determining what tasks may fail as a result of failure to share needed information;
propagating an impact of such failure on one or more other tasks and identifying indirect impacts of said issue;
assigning a severity level to such failure.

16. The method of claim 14, further comprising the following step:
estimating an expense associated with remediating said one or more communication problems.

17. The method of claim 16, further comprising the following steps:
prioritizing an expense in relation to other expenses which may be necessary in fulfilling other information sharing needs.

18. The method of claim 2, further comprising the following steps:
creating one or more scenarios, with each scenario including one or more storylines, wherein the creating of each scenario includes the following steps:
specifying at least one appropriate category for each element in said scenario;
adding at least one event or task to said scenario;
identifying one or more situations applicable to said scenario.

19. The method of claim 18, further comprising the following steps:
adding an event by performing the following steps:
assigning the event to one or more storylines in the scenario;
identify an event or task which may cause the occurrence of this event;
identify an expected duration of the event; identify one or more tasks which may terminate the event.

20. The method of claim 18, further comprising the following steps:
adding a task by performing the following steps:
assigning the task to one or more storylines in the scenario;
identifying a category of an objective of the task;
identifying an event or task which may cause the occurrence of the task;
identify an expected duration of the task.

21. The method of claim 18, further comprising the following steps:
defining one or more categories used in identifying scenarios, wherein the defining of each category includes the following steps:
selecting an appropriate taxonomy for each type of element;
describing said category;
identifying other categories which may be implied by said category;
identifying a discipline associated with said category;
determining whether there is an applicable standard associated with said category.

22. The method of claim 21, further comprising the following steps:
associating an information template with a category by describing a group of one or more information items regarding an item in said category.

23. The method of claim 18, further comprising the following steps:
identifying a role which needs information for a selected scenario;
identify an object of interest and specify information which is needed;
determining a criticality of the needed information.

24. The method of claim 23, further comprising the following steps:
identifying a source of available information for the needed information, where the available information matches needed information if at least one element of information in the available information matches at least one element of information in the needed information.

25. A system for analyzing information transfer among a plurality of parties, comprising:
a programmed processor;
a memory containing instructions for execution by the programmed processor, the instructions operative to perform the following steps:
identifying an event which may occur, and in connection therewith identifying a task which needs to be performed based on said event occurring;
identifying one or more parties associated with said event, and further identifying one or more parties involved in carrying out said task;
for each party involved in carrying out said task, determining information available to each said party involved in carrying out said task prior to said task being carried out, and also determining information not yet available but necessary for carrying out said task for each said party involved in carrying out said task prior to said task being carried out;
determining a need for communication of information by one or more of said parties to carry out said task;
determining whether said need for communication of information may be fulfilled based on information available to each said party, and if said need for communication may not be fulfilled, then determining whether said information which is not yet available may be satisfied from an available source and determining a corresponding expense for satisfying said information need;
and prioritizing said expense in relation to other expenses which may be necessary in fulfilling other information sharing needs.

26. A system for analyzing information transfer among a plurality of parties, comprising:
- a programmed processor;
- a memory containing instructions for execution by the programmed processor, the instructions operative to perform the following steps:
    - identifying the scope and parties involved in information transfer for a given information transfer project;
    - defining resources and scenarios for information sharing using terms commonly understood by said parties;
    - identifying constraints on the transfer of information;
    - profiling sources of information for the information transfer project;
    - assembling one or more scenarios, where each scenario is associated with an event and a task in response to said event;
    - identifying one or more parties associated with said event, and further identifying one or more parties involved in carrying out said task;
    - for each party involved in carrying out said task, determining information available to each said party involved in carrying out said task prior to said task being carried out, and also determining information not yet available but necessary for carrying out said task for each said party involved in carrying out said task prior to said task being carried out;
    - determining a need for communication of information not yet available by one or more of said parties to carry out said task;
    - identifying sharing needs by identifying a source of said as yet unavailable information;
    - creating a communications plan which satisfies said sharing need by transferring information from an available source of information to a party in need of said information available from said source.

* * * * *